(12) United States Patent
Yan et al.

(10) Patent No.: US 12,089,092 B2
(45) Date of Patent: Sep. 10, 2024

(54) HANDOVER METHOD, APPARATUS, AND SYSTEM IN WIRELESS COMMUNICATION SYSTEM

(71) Applicant: Huawei Technologies Co., Ltd., Shenzhen (CN)

(72) Inventors: Le Yan, Shenzhen (CN); Hongping Zhang, Shenzhen (CN); Qinghai Zeng, Shanghai (CN); Tingting Geng, Shanghai (CN); Xingxing Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 17/401,913

(22) Filed: Aug. 13, 2021

(65) Prior Publication Data

US 2021/0377816 A1   Dec. 2, 2021

Related U.S. Application Data

(63) Continuation of application No. PCT/CN2020/074511, filed on Feb. 7, 2020.

(30) Foreign Application Priority Data

Feb. 15, 2019   (CN) .......................... 201910118135.0

(51) Int. Cl.
*H04W 36/00*   (2009.01)
*H04W 76/12*   (2018.01)

(52) U.S. Cl.
CPC ... *H04W 36/0016* (2013.01); *H04W 36/0022* (2013.01); *H04W 36/0061* (2013.01); *H04W 76/12* (2018.02)

(58) Field of Classification Search
CPC ......... H04W 36/0016; H04W 36/0022; H04W 36/0061; H04W 76/12; H04W 76/22;
(Continued)

(56) References Cited

U.S. PATENT DOCUMENTS

2003/0058825 A1   3/2003  Hussain
2010/0177739 A1*  7/2010  Huang .............. H04W 36/0011
                                                370/331
(Continued)

FOREIGN PATENT DOCUMENTS

CN   101784033 A   7/2010
CN   101888675 A   11/2010
(Continued)

OTHER PUBLICATIONS

3GPP TR 23.725 V2.0.0 (Dec. 2018), 3rd Generation Partnership Project; Technical Specification Group Services and System Aspects; Study on enhancement of Ultra-Reliable Low-Latency Communication (URLLC) support in the 5G Core network (5GC) (Release 16), 75 pages.
(Continued)

*Primary Examiner* — Michael Y Mapa
(74) *Attorney, Agent, or Firm* — Slater Matsil, LLP

(57) ABSTRACT

A source base station receives a first data packet from a core network device; a target base station receives a second data packet from the core network device, where the second data packet is a duplicate of the first data packet, and the first data packet and the second data packet each include a first index; the source base station sends first indication information to the target base station, where the first indication information indicates a mapping relationship between the first index and a second index; the source base station sends a third data packet to a user equipment UE in response to the first data packet; the target base station sends a fourth data packet to
(Continued)

the UE in response to the second data packet, where the third data packet and the fourth data packet each include the second index.

20 Claims, 9 Drawing Sheets

(58) Field of Classification Search
CPC .......... H04W 36/026; H04W 36/0055; H04W 36/08; H04W 36/02; H04W 36/06
USPC .................................. 370/331; 455/436–444
See application file for complete search history.

(56) References Cited

U.S. PATENT DOCUMENTS

| | | | |
|---|---|---|---|
| 2010/0260097 A1* | 10/2010 | Ulupinar | H04W 40/36 370/315 |
| 2016/0262066 A1 | 9/2016 | Ozturk et al. | |
| 2017/0289879 A1 | 10/2017 | Wang et al. | |
| 2018/0367288 A1 | 12/2018 | Vrzic et al. | |
| 2019/0268815 A1* | 8/2019 | Zhu | H04W 36/026 |
| 2019/0335379 A1* | 10/2019 | Joseph | H04W 28/06 |
| 2021/0014756 A1* | 1/2021 | Liu | H04W 36/0011 |
| 2021/0168681 A1* | 6/2021 | Kweon | H04L 1/08 |

FOREIGN PATENT DOCUMENTS

| | | |
|---|---|---|
| CN | 102065501 A | 5/2011 |
| CN | 103026753 A | 4/2013 |
| CN | 103796258 A | 5/2014 |
| CN | 103944943 A | 7/2014 |
| CN | 108616945 A | 10/2018 |
| CN | 108924876 A | 11/2018 |
| KR | 20120023189 A | 3/2012 |
| WO | 2004015933 A1 | 2/2004 |
| WO | 2018171791 A1 | 9/2018 |

OTHER PUBLICATIONS

3GPP TR 23.725 V16.0.0 (Dec. 2018), 3rd Generation Partnership Project; Technical Specification Group Services and System Aspects; Study on enhancement of Ultra-Reliable Low-Latency Communication (URLLC) support in the 5G Core network (5GC) (Release 16), 76 pages.

3GPP TR 38.913 V15.0.0 (Jun. 2018), 3rd Generation Partnership Project; Technical Specification Group Radio Access Network; Study on Scenarios and Requirements for Next Generation Access Technologies (Release 15), 39 pages.

Huawei et al., "Discussion on duplication during handover procedure", 3GPP TSG-RAN WG2 #105, R2-1900710, Athens, Greece, Feb. 25-Mar. 1, 2019, 3 pages.

Intel Corp., "Packet duplication for URLLC in DC and CA deployment", 3GPP TSG-RAN WG2 NR Ad-hoc, R2-17003336, Spokane, WA, US, Jan. 17-19, 2017, 3 pages.

Oppo, Huawei, Updating for solution#5 in FS_URLLC. SA WG2 Meeting #128bis, Aug. 20-24, 2018, Sophia Antipolis, France, S2-188481, 10 pages.

Oppo, Huawei, Updating for solution#5 in FS_URLLC. SA WG2 Meeting #128bis, Aug. 20-24, 2018, Sophia Antipolis, France, S2-188397, 10 pages.

Oppo, Updating for solution#5 in FS_URLLC. SA WG2 Meeting #128, Jul. 2-6, 2018, Vilnius, Lithuania, S2-186516, 9 pages.

* cited by examiner

HANDOVER METHOD, APPARATUS, AND SYSTEM IN WIRELESS COMMUNICATION SYSTEM

CROSS-REFERENCE TO RELATED APPLICATIONS

This application is a continuation of International Application No. PCT/CN2020/074511, filed on Feb. 7, 2020, which claims priority to Chinese Patent Application No. 201910118135.0, filed on Feb. 15, 2019, The disclosures of the aforementioned applications are hereby incorporated by reference in their entireties.

TECHNICAL FIELD

This application relates to the field of communication technologies, and in particular, to a handover method, apparatus, and system in a wireless communication system.

BACKGROUND

In a mobile communication system, as a user equipment (UE) moves, a network hands over the user equipment from a source cell to a target cell through a handover process to perform data transmission. After sending, to the user equipment over an air interface, a command used for handover, the source base station stops performing uplink and downlink data transmission on the user equipment. Then, the source base station sends a sequence number status transfer message to a target base station and forwards (data forwarding) data packets to the target base station. For example, for an uplink, the source base station forwards received out-of-order uplink data packets (starting from the first out-of-order UL data packet and all other data packets (if existent) following the first out-of-order packet) to the target base station. For a downlink, the source base station forwards, to the target base station, a downlink data packet that has been sent to the user equipment but whose reception is not acknowledged as a success by the user equipment and a new data packet from a core network. Before and after the handover, for a same bearer/service, data transmission that cannot be completed by the user equipment on the source base station continues to be completed on the target base station after the user equipment is successfully handed over to the target base station.

In the foregoing handover process, data packet forwarding between the source base station and the target base station causes a delay. Especially when backhaul between the base stations is not ideal, the delay is relatively large, and user experience of a delay-sensitive service is reduced. Therefore, how to reduce the delay caused by the data forwarding is a problem that needs to be resolved.

SUMMARY

This application provides an information transmission method, apparatus, and system, to reduce a data transmission delay.

According to an aspect, a communication method and a corresponding communication apparatus and communication system are provided.

A source base station of a user equipment UE receives a first data packet from a core network device; a target base station of the UE receives a second data packet from the core network device, where the second data packet is a duplicate of the first data packet, and the first data packet and the second data packet each include a first index; the source base station sends first indication information to the target base station, where the first indication information indicates a mapping relationship between the first index and a second index; the source base station sends a third data packet to the user equipment UE in response to the first data packet; the target base station sends a fourth data packet to the UE in response to the second data packet, where the third data packet and the fourth data packet each include the second index.

In the foregoing solution, the source base station and the target base station use a same mapping relationship, so that the UE can correctly receive data packets from the source base station and the target base station, thereby helping the UE correctly perform duplicate packet detection, data packet reordering, or in-order delivery.

The second data packet and the first data packet include at least a same payload.

Optionally, the method farther includes: The core network device sends second indication information to the source base station. The source base station receives the second indication information, and determines the mapping relationship between the first index and the second index. The second indication information may be included in the first data packet, or the second indication information is carried in a separate message by the core network device and notified to the source base station.

In a possible implementation, the method further includes: The source base station receives a fifth data packet from the UE, and sends a seventh data packet to the core network device in response to the fifth data packet. The target base station receives a sixth data packet from the UE, and sends an eighth data packet to the core network device in response to the sixth data packet. The sixth data is a duplicate of the fifth data packet. The fifth data packet and the sixth data packet each include a third index. The seventh data packet and the eighth data packet each include a fourth index.

In a possible implementation, the fifth data packet and the sixth data packet include at least a same payload, and use a same index, so that a data packet from the UE is correctly received by a network side, to ensure normal communication in a UE handover process.

Optionally, the source base station sends third indication information to the target base station, where the third indication information indicates a mapping relationship between the third index and the fourth index. Therefore, the target base station and the target base station may send, to the core network device by using a same index, a data packet used for the UE, thereby ensuring that data from the UE is correctly received in the UE handover process.

In the foregoing solution, the source base station and the target base station use a same mapping relationship, so that it is ensured that, the core network device can correctly receive, from the source base station and the target base station, data from the UE separately, thereby helping the UE perform an operation such as duplicate packet detection, data packet reordering, or in-order delivery.

Optionally, the UE sends fourth indication information to the source base station. The source base station determines the mapping relationship between the third index and the fourth index based on the indication information. The fourth indication information is included in the fifth data packet, or is carried by the UE by using another message.

In an implementation, the first indication information includes a value of the first index and a value of the second index corresponding to the first index. In another possible implementation, the first indication information includes a mapping formula of the first index and the second index corresponding to the first index. In still another possible implementation, the first indication information includes a difference between a value of the first index and a value of the second index corresponding to the first index.

According to another aspect, a communication method and a corresponding communication apparatus and communication system are provided.

A target base station of a user equipment UE receives a handover request message from a source base station of the UE. The target base station sends a request message to a first core network device in response to the handover request message, to request a duplicate of a first data packet, where the first data packet is a data packet that is sent by a second core network device to the source base station and that is used for the user equipment UE. The first core network device and the second core network device are a same core network device or different core network devices.

Optionally, the target base station receives an acknowledgment message for the request message from the first core network device.

Optionally, the target base station further sends a handover request acknowledgment message to the source base station.

In the foregoing solution, in a handover process between the source base station and the target base station, for example, during handover preparation, a transmission tunnel is established between the target base station and a core network device, to start a duplication procedure as soon as possible. Further, before quality of a link between the UE and the source base station deteriorates, the tunnel that is used to transmit a duplication data packet and that is between the target base station and the core network device is successfully established, thereby ensuring data transmission reliability.

The target base station receives a duplicate of the first data packet from the second core network device. For example, the duplicate of the first data packet may be sent by the second core network device to the target base station, or forwarded by the first core network device to the target base station.

In a possible implementation, the source base station sends a third data packet to the UE in response to the first data packet. The first data packet and the duplicate of the first data packet each include a first index. The target base station sends a fourth data packet to the UE in response to the duplicate of the first data packet. The third data packet and the fourth data packet each include a second index.

Correspondingly, a communication apparatus is further provided. The communication apparatus may be a base station, and is used as a target base station of a UE. Alternatively, the communication apparatus may be a device in a target base station of a UE, for example, a communication chip. The communication apparatus includes a sending unit and a receiving unit. The sending unit and the receiving unit respectively implement a sending function and an implementation function in the foregoing method. The sending unit may be a transmitter, a transmitter, a sending circuit, an output circuit, an interface of the communication chip, or any other means that can implement the sending function. The receiving unit may be a receiver, a receiver, a receiving circuit, and an input circuit of the base station, an interface of the communication chip, or any other means that can implement the receiving function. In a possible implementation, the receiving unit is configured to receive a handover request message from a source base station. The sending unit is configured to send a request message to a first core network device in response to the handover request message, to request a duplicate of a first data packet, where the first data packet is a data packet that is sent by a second core network device to the source base station and that is used for the user equipment UE, and the first core network device and the second core network device are a same core network device or different core network devices.

According to still another aspect, a communication method and a corresponding communication apparatus and system are provided.

A user equipment UE sends data packets $P_1$, $P_2$, ..., and $P_N$ to a source base station. The UE sends data packets $P_i$ to $P_N$ to a target base station, where the data packet $P_i$ is the $1^{st}$ data packet not correctly received by the source base station in the data packets $P_1$ to $P_N$, N is an integer greater than or equal to 1, and i is an integer greater than or equal to 1 and less than or equal to N. The target base station receives the data packets $P_i$ to $P_N$ from the user equipment, and sends the data packets $P_i$ to $P_N$ to a core network device. The source base station sends a data packet before the data packet $P_i$ in the data packets $P_1$ to $P_N$ to the core network device.

The UE sends the $1^{st}$ data packet that is not correctly received and a subsequent data packet to the target base station, so that a possibility of packet loss can be reduced, and data transmission reliability can be improved.

Indexes of the data packets $P_1$ to $P_N$ are continuously increasing, continuously decreasing, or arranged according to a preset rule.

Optionally, the UE receives indication information from the source base station before sending $P_i$ to $P_N$ to the target base station, and the indication information indicates the UE to send the data packets $P_i$ to $P_N$ to the target base station. For example, the indication information is included in a radio resource control RRC reconfiguration message or another message.

Optionally, before the UE sends the data packets $P_i$ to $P_N$ to the target base station, the UE determines a data packet not correctly received by the source base station or the $1^{st}$ data packet not correctly received by the source base station. If the UE receives, from the source base station, no response to the data packet $P_i$, or receives, from the source base station, a negative acknowledgment NACK of the data packet $P_i$, and receives an acknowledgment ACK of the data packet before $P_i$ in the data packets $P_1$ to $P_N$, the UE determines that the data packet $P_i$ is the $1^{st}$ data packet not correctly received by the source base station in the data packets $P_i$ to $P_N$.

Correspondingly, a communication apparatus and a communication system are further provided. The communication apparatus may be a user equipment UE, or a communication chip used in a user equipment. The communication apparatus includes a sending unit, configured to implement a sending function in the foregoing method. For example, the sending unit is configured to send data packets $P_1$, $P_2$, ..., and $P_N$ to a source base station and send data packets $P_i$ to $P_N$ to a target base station separately, where the data packet $P_i$ is the $1^{st}$ data packet not correctly received by the source base station in the data packets $P_1$ to $P_N$, N is an integer greater than or equal to 1, and i is an integer greater than or equal to 1 and less than or equal to N. The sending unit may be a transmitter, a transmitter, a sending circuit, an output circuit, an interface of the communication chip, or any other means that can implement the sending function.

The processing apparatus further includes a processing unit, configured to determine whether the sent data packet is correctly received. For example, the processing unit determines a data packet not correctly received by the source base station or the $1^{st}$ data packet not correctly received by the source base station. If the communication apparatus receives, from the source base station, no response to the data packet $P_i$, or receives, from the source base station, a negative acknowledgment NACK of the data packet $P_i$, and receives an acknowledgment ACK of a data packet before $P_i$ in the data packets $P_1$ to $P_N$, the processing unit determines that the data packet $P_i$ is the $1^{st}$ data packet not correctly received by the source base station in the data packets $P_1$ to $P_N$.

Correspondingly, a communication apparatus is further provided. The communication apparatus is a base station, and may be used as a source base station and/or a target base station of a UE. Alternatively, the communication apparatus is used as a device in a source base station and/or a target base station of a UE, for example, a communication chip. The communication apparatus includes a sending unit and a receiving unit. The sending unit and the receiving unit respectively implement a sending function and an implementation function in the foregoing method. The sending unit may be a transmitter, a transmitter, a sending circuit, an output circuit, an interface of the communication chip, or any other means that can implement the sending function. The receiving unit may be a receiver, a receiver, a receiving circuit, and an input circuit of the base station, an interface of the communication chip, or any other means that can implement the receiving function.

Correspondingly, a communication system is further provided, and includes a source base station and a target base station.

The target base station is configured to receive data packets $P_i$ to $P_N$ from the user equipment, where the data packet $P_i$ is the $1^{st}$ data packet not correctly received by the source base station in data packets $P_1$ to $P_N$ sent by the user equipment to the source base station, N is an integer greater than or equal to 1, and i is an integer greater than or equal to 1 and less than or equal to N.

The target base station is further configured to send the data packets $P_i$ to $P_N$ to a core network device.

The source base station is configured to send a data packet before the data packet $P_i$ in the data packets $P_1$ to $P_N$ to the core network device.

The foregoing uplink transmission solution reduces a possibility of packet loss, and improves data transmission reliability.

Optionally, before the target base station receives the data packets $P_i$ to $P_N$, the target base station is further configured to send indication information to the source base station, where the indication information indicates the user equipment to send the data packets $P_i$ to $P_N$ to the target base station.

According to yet another aspect, a communication method, a communication apparatus, and a communication system are provided. A source base station receives a first group of data packets from a user equipment, and sends the first group of data packets to a core network device. A target base station receives a second group of data packets from the user equipment, and sends the second group of data packets to the core network device. The first group of data packets are data packets correctly received by the source base station in data packets sent by the user equipment to the source base station, and the second group of data packets are retransmitted data packets of data packets not correctly received by the source base station in the data packets sent by the user equipment to the source base station.

The communication method can reduce a possibility of packet loss, and improve data transmission reliability.

In a possible implementation, the first group of data packets are data packets having discontinuous indexes.

The units in the communication apparatuses in the foregoing aspects may be implemented by using software, hardware, or a combination of software and hardware.

In a possible implementation, the communication apparatuses in the foregoing aspects each include one or more processors and one or more memories. The memory stores instructions or an agent that may be executed by the one or more processors. When the instructions or the code is run, the communication apparatuses are enabled to perform the methods in the foregoing aspects.

Still another aspect of this application provides a computer-readable storage medium. The computer-readable storage medium stores instructions. When the instructions are run on a computer, the computer is enabled to perform the methods according to the foregoing aspects.

Still another aspect of this application provides a computer program product including instructions. When the computer program product runs on a computer, the computer is enabled to perform the methods according to the foregoing aspects.

BRIEF DESCRIPTION OF THE DRAWINGS

To describe technical solutions in embodiments of the present invention or the prior art more clearly, the following briefly describes accompanying drawings used in describing the embodiments or the prior art.

DETAILED DESCRIPTION OF ILLUSTRATIVE EMBODIMENTS

The following describes the embodiments of the present invention in detail with reference to the accompanying drawings. A network architecture and a service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that, with evolution of the network architecture and emergence of a new service scenario, the technical solutions provided in the embodiments of the present invention are also applicable to similar technical problems.

Figure 1:
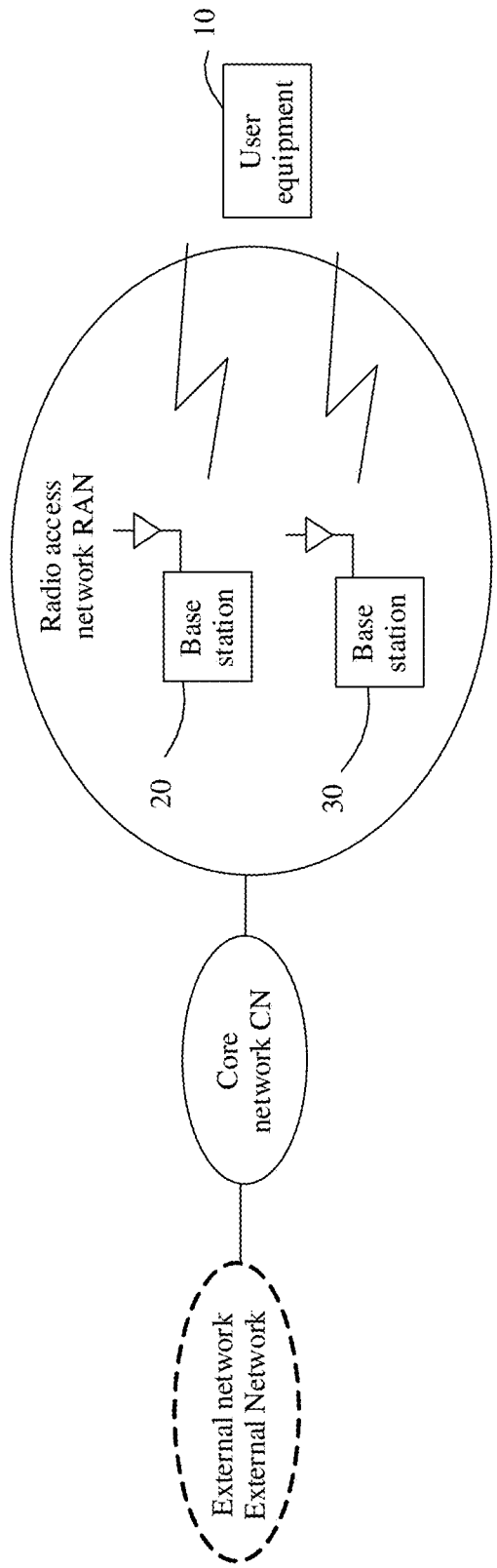
FIG. 1 is a schematic structural diagram of a possible system for implementing an embodiment of the present invention.

FIG. 1 is a schematic diagram of a possible system network according to this application. As shown in FIG. 1, at least one terminal 10 communicates with a radio access network (RAN). The RAN includes at least two base stations: a base station 20 and a base station 30. Only two base stations and one user equipment UE are shown in the figure. The RAN is connected to a core network (CN). The core network includes one or more core network devices. Optionally, the CN may be coupled to one or more external networks such as the internet Internet and a public switched telephone network (PSTN). In a movement process of the UE, a connection to the radio access network may be handed over from the base station 20 to the base station 30. In this case, the base station 20 may be referred to as a source base station, and the base station 30 may be referred to as a target base station.

To facilitate understanding, the following describes some nouns in this application.

In this application, nouns "network" and "system" are often used alternately. However, a person skilled in the art may understand meanings thereof. A communication apparatus described in this application refers to a network element in a communication system, for example, a terminal, a base station (a source base station or a target base station), or a core network device.

The terminal is also sometimes referred to as a user equipment (UE). The UE is a terminal device having a communication function, may also be referred to as a terminal, and may include a handheld device, a vehicle-mounted device, a wearable device, or a computing device that has a wireless communication function, another processing device connected to a wireless modem, or the like. The user equipment may have different names in different networks, for example, a terminal, a mobile station, a subscriber unit, a station, a cellular phone, a personal digital assistant, a wireless modem, a wireless communication device, a handheld device, a laptop computer, a cordless phone, and a wireless local loop station. For ease of description, in this application, these devices are briefly referred to as user equipment UEs or terminals.

The base station (BS) may be a radio access device in a cloud network or a device having a wireless transceiving function, for example, a relay station. The base station may also be referred to as a base station device, and is a network device deployed in a radio access network to provide a wireless communication function. The base station may have different names in different radio access systems. For example, a base station in a universal mobile telecommunications system (UMTS) network is referred to as a NodeB, a base station in an LTE network is referred to as an evolved NodeB (eNB or eNodeB), and a base station in a 5G system may be referred to as a transmission reception point (Transmission Reception Point, TRP) or a gNodeB (gNB). The base station may include one or more co-site or non-co-site TRPs. The base station may alternatively be a radio controller, a centralized unit (CU), and/or a distributed unit (DU) in a cloud radio access network (CRAN) scenario. The base station may alternatively be a server, a wearable device, a vehicle-mounted device, or the like. For ease of description, the following uses the base station for description. Optionally, the base station in the present invention may alternatively be a user equipment in device to device D2D (Device to Device). Optionally, the base station and the user equipment in the present invention may alternatively be relay devices, or a network device or a user equipment that implements a relay function.

The following uses a 5G network as an example to describe the solutions provided in the embodiments of the present invention. However, the solutions in the present invention are not limited to the 5G network. For example, the solutions in the present invention may alternatively be applicable to LTE, a subsequently evolved network, or a plurality of converged networks. This is not limited in the embodiments of the present invention.

Embodiment 1

Figure 2:
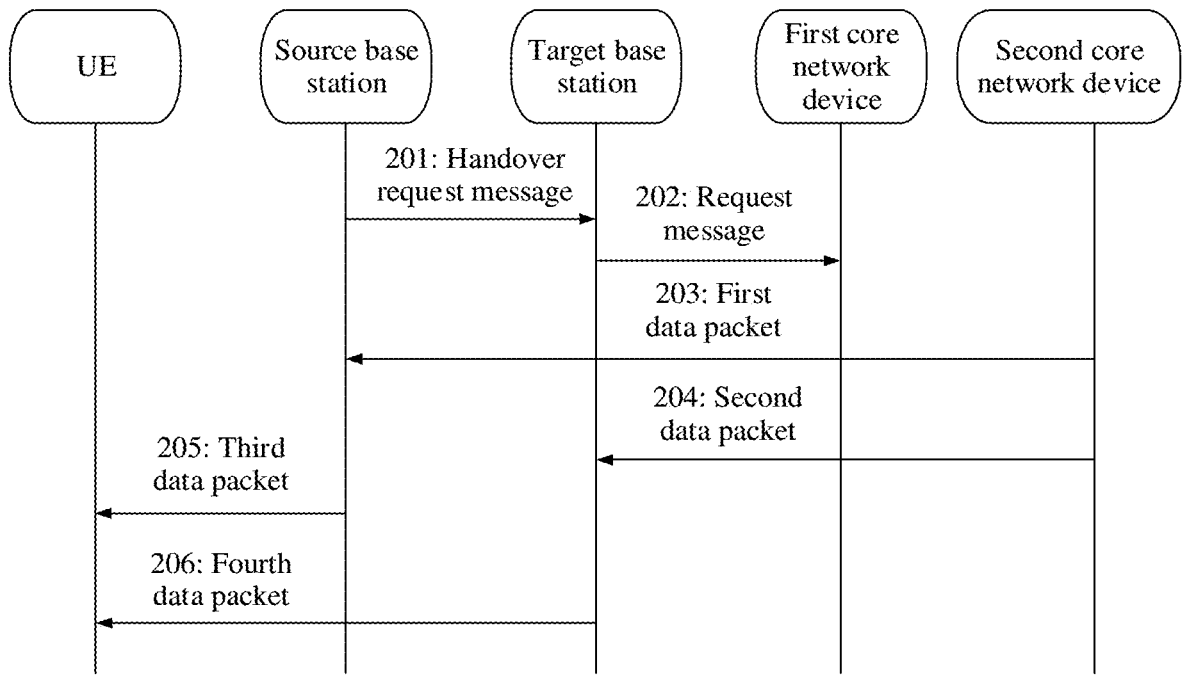
FIG. 2 is a flowchart of a communication method according to an embodiment of the present invention.

This embodiment provides a communication method, apparatus, and system. The solution may be applied to the system shown in FIG. 1. As shown in FIG. 2:

Step 201: A source base station sends a handover request message to a target base station.

In this embodiment, when determining that a UE needs to be handed over from the source base station to the target base station, the source base station sends the handover request message to the target base station, to request to hand over the UE to the target base station.

Step 202: The target base station sends a request message to a first core network device in response to the handover request message, to request a duplicate of a first data packet, where the first data packet is a data packet that is sent by a second core network device to the source base station and that is used for the user equipment UE.

Optionally, the first core network device may be an access and mobility management function (AMF) device, and the second core network device may be a user plane function (UPF) device.

In this embodiment of the present invention, optionally, the first core network device and the second core network device may be a same core network device or different core network devices.

For ease of description, a function of the "core network device" is described in this application. The first core network device or the second core network device may have the function of the core network device unless otherwise specified.

The request message may be, for example, a duplication request message, or the request message has other representation and naming manners. This is not limited.

In some scenarios, that the target base station sends the request message such as a duplication request may also be understood as requesting a core network device to send the first data packet to the source base station, and requesting the core network device to send the duplicate of the first data packet to the target base station.

The duplicate of the first data packet may be referred to as a second data packet. For the first data packet and the second data packet, at least payloads are the same. Content of the first data packet and content of the second data packet may be completely the same or incompletely the same (for example, the payloads are the same, and other information is different).

Optionally, the core network device may include one or more of the following function entities: an access and mobility management function (AMF), a session management function (SMF), or a user plane function (UPF). The AMF is also sometimes referred to as an AMF device, an AMF entity, or another name, the SMF is also sometimes referred to as an SMF device, an SMF entity, or another name, and the UPF is also sometimes referred to as a UPF device, a UPF entity, or another name. In addition, the core network device may further include other function entities. The function entities may be separately independent physical entities, or may be physically integrated. This is not limited in this embodiment of the present invention.

In an implementation, that the target base station requests the second core network device to send the duplicate of the first data packet to the target base station may be specifically as follows:

The target base station sends the foregoing request message to the access and mobility management function (AMF) device, where the request message may include a protocol data unit (PDU) session identifier (for example, a PDU session ID) and a QoS flow identifier accepted/allowed by the source base station (for example, the list of accepted QoS Flow ID(s)), and the request message may further include address information of the target base station and UE identification information; after receiving the foregoing request message, the AMF device performs a session update procedure with the session management function (SMF) device; the SMF device performs a session modification procedure with the user plane function (UPF) device. Optionally, the address information of the target base station may be at least one of the following: an IP address or a GPRS tunneling protocol tunnel endpoint identifier (GTP TEID). The address information of the target base station may be used by the core network device to determine an address of the target base station, so that a tunnel used to transmit data can be established between the core network device and the target base station. The UE identification information may include at least one of the following: a RAN UE NGAP ID, a source NG-RAN node UE XnAP ID reference, and a source AMF UE NGAP ID. The RAN UE NGAP ID (radio access network user equipment next-generation application protocol identifier) is an identifier allocated by the source base station, and the UE may be identified based on the identifier over an NG interface (namely, an interface between an NG-RAN node and the core network device such as the AMF device). The source AMF UE NGAP ID (source access and mobility management function user equipment next-generation application protocol identifier) is an identifier allocated by a source AMF device, the identifier corresponds to a source next-generation control plane connection (source NG-C connection), the UE may be identified based on the identifier over the NG interface (namely, the interface between the NG-RAN node and the core network device such as the AMF device), and the identifier may be used to index UE context information on the source AMF device (or a serving AMF device, namely, an AMF device to which the source base station is connected). The source NG-RAN node UE XnAP ID reference (source next-generation radio access network node user equipment Xn application protocol identifier reference) is an identifier allocated by the source base station, and the UE may be identified based on the identifier over an Xn interface (namely, an interface between two base stations). The UE identification information may be used to uniquely identify the user equipment in an access network RAN (for example, a base station) or a core network CN (for example, the core network device), so that the tunnel used to transmit data can be established between the core network device and the target base station. Optionally, when the AMF device performs the session update procedure with the SMF device, a session update request message (for example, a session update request message) may include at least one of the PDU session ID, the QoS flow identifier accepted/allowed by the source base station, the address information of the target base station, and the UE identification information. This is not limited in this embodiment of the present invention. Optionally, when the SMF device performs the session modification procedure with the UPF device, a session modification request message (for example, a session modification request message) may include at least one of the PDU session ID, the QoS flow identifier accepted/allowed by the source base station, the address information of the target base station, and the UE identification information. This is not limited in this embodiment of the present invention.

In this embodiment, optionally, the AMF device performs the session update procedure with the SMF device, and the SMF device performs the session modification procedure with the UPF device.

Figure 2A:
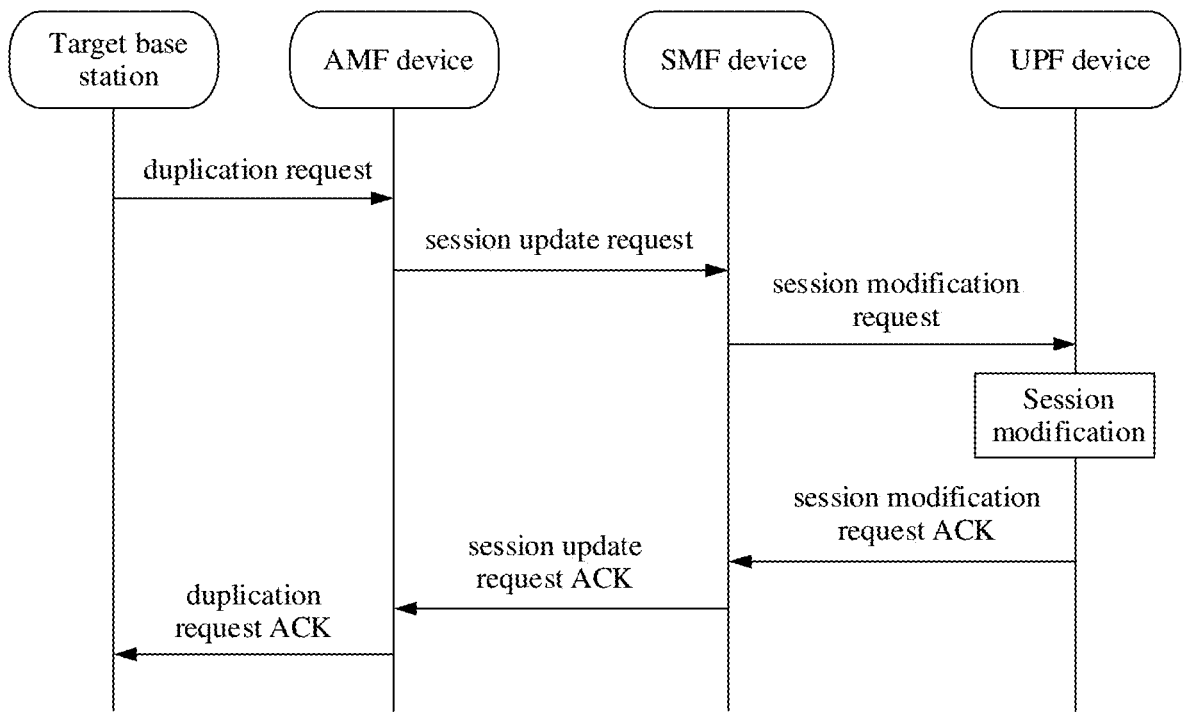
FIG. 2a is a flowchart of a communication method according to an embodiment of the present invention.

For example, as shown in FIG. 2a, the AMF device sends the session update request message to the SMF device. After receiving the request message, the SMF device sends a session modification request to the UPF device. The UPF device performs session modification based on the request of the SMF device. Then, the UPF device replies to the SMF device with a session modification request ACK message. After receiving the ACK message, the SMF device sends a session update request ACK message to the AMF device. After the AMF device receives the ACK message, the AMF device sends, to the target base station, a reply message (for example, a duplication request acknowledgment message duplication request ACK) corresponding to the request message (for example, the duplication request message) sent by the target base station to the AMF device. After receiving the duplication request acknowledgment message, the target base station sends a handover request acknowledgment message to the source base station.

In this embodiment, for downlink data transmission, a process in which the UPF device performs data packet duplication, the UPF device sends the first data packet to the source base station, and the UPF device sends the duplicate of the first data packet to the target base station may be referred to as a duplication process or a duplication operation. The first data packet and the duplicate of the first data packet may be collectively referred to as a duplication data packet. For uplink data transmission, a process in which the user equipment performs data packet duplication, to be specific, the user equipment sends a fifth data packet to the source base station, and the user equipment sends a duplicate of the fifth data packet to the target base station may also be referred to as a duplication process or a duplication operation. The fifth data packet and the duplicate of the fifth data packet may be collectively referred to as a duplication data packet. It should be noted that data carried in a data packet and data carried in a duplicate corresponding to the data packet may be completely the same, or may be incompletely the same. For example, for the data packet and the duplicate corresponding to the data packet, at least payloads (for example, payloads) are the same, but other information carried in the two data packets may be the same or different. In an example, address information carried in the two data packets is different. For example, one data packet carries address information of the source base station, and a duplicate corresponding to the data packet carries the address information of the target base station. Other differences are not described herein.

In this embodiment, in a handover process, after the target base station receives the handover request message, a procedure of establishing the tunnel between the target base station and the core network device (for example, the AMF device, the SMF device, or the UPF device) is started. That is, a transmission tunnel between the target base station and the AMF device, the SMF device, or the UPF device is established. In the handover process, the UPF device may send separately a duplication data packet to the source base station and the target base station. Further, the source base station and the target base station may separately send the duplication data packet received from the UPF device to the user equipment. The source base station does not need to forward data to the target base station. This reduces a transmission delay caused in a data forwarding process.

Optionally, the foregoing method further includes the following steps.

Step 203: The source base station receives the first data packet from the second core network device.

Step 204: The target base station receives the second data packet from the second core network device.

Optionally, the foregoing method further includes the following steps.

Step 205: The source base station sends a third data packet to the user equipment in response to the first data packet.

Step 206: The target base station sends a fourth data packet to the user equipment in response to the second data packet.

In this embodiment of the present invention, a process in which the source base station sends the third data packet to the UE and the target base station sends the fourth data packet to the UE may also be referred to as a duplication process. The third data packet and a duplicate (namely, the fourth data packet) of the third data packet may also be collectively referred to as a duplication data packet.

In this embodiment of the present invention, optionally, the first data packet and the duplicate (namely, the second data packet) of the first data packet carry same data (for example, same payloads) used for the UE, but may have different packet headers (for example, different address information).

In this embodiment, after receiving the first data packet, the source base station may perform corresponding processing, for example, data parsing and packet header processing, on the first data packet, and then send the data packet to the UE, but a payload of the data packet of the UE does not change. A process of processing the duplicate of the first data packet by the target base station is similar.

In this embodiment, optionally, after the UPF device starts the duplication process (for example, after a tunnel that is used to transmit duplication data packets and that is between the target base station and the AMF device, the SMF device, or the UPF device is successfully established), when the UPF device is to send the $1^{st}$ duplication data packet, the UPF device may send a piece of indication information to the source base station. For example, the indication information is an end marker. The indication information is used to notify the source base station that the UPF device starts a duplication function. That is, the UPF device is to start to send a data packet to the source base station and send a duplicate corresponding to the data packet to the target base station. Alternatively, the indication information may be carried in a packet header of the $1^{st}$ duplication data packet sent by the UPF device to the source base station after the UPF device starts the duplication process. For example, the indication information may be included in a GTP-U packet header. This is not limited in the present invention. Optionally, when the source base station receives the indication information, if there is an unsent data packet used for the UE in a data buffer of the source base station, that is, a non-duplication data packet that is received by the source base station from the UPF device but is not sent to the user equipment before the duplication process is started is buffered in the data buffer of the source base station, in an implementation, the source base station preferentially sends the foregoing unsent data packet used for the UE to the user equipment by default, and the source base station sends, after sending the unsent data packet used for the UE to the user equipment, duplication data packets received from the UPF device to the user equipment; or in another implementation, the foregoing indication information sent by the UPF device to the source base station may alternatively be understood as that the indication information is used to indicate the source base station to preferentially send the unsent data packet used for the UE to the user equipment. That is, after the source base station receives the indication information, for example, the indication information may be the end marker or indication information included in the packet header of the $1^{st}$ duplication data packet sent by the UPF device to the source base station, the source base station preferentially sends the unsent data packet used for the UE to the user equipment, and the source base station sends, after sending the unsent data packet used for the UE to the user equipment, duplication data packets received from the UPF device to the user equipment. This is not limited in this embodiment.

In this embodiment, optionally, for an uplink, after the UPF device starts the duplication process (for example, after the tunnel that is used to transmit the duplication data packets and that is between the target base station and the AMF device, the SMF device, or the UPF device is successfully established), after a connection between the UE and the target base station is established (for example, after a random access process between the UE and the target base station succeeds and the UE is successfully handed over to the target base station), the UE may also send a data packet to the source base station, and send a duplicate corresponding to the data packet to the target base station. The source base station and the target base station may separately send the data packet and the duplicate corresponding to the data packet to the UPF device. In this embodiment of the present invention, optionally, a process in which the source base station sends the data packet to the UPF device and the target base station sends the duplicate of the data packet to the UPF device may also be referred to as a duplication process. The data packet and the duplicate of the data packet may also be collectively referred to as a duplication data packet.

In this embodiment, in a preparation process of handover between the source base station and the target base station, the transmission tunnel is established between the target base station and the core network device, to start a duplication operation. Further, before quality of a link between the UE and the source base station deteriorates, the tunnel that is used to transmit the duplication data packets and that is between the target base station and the core network device is successfully established. Therefore, data that cannot be successfully transmitted by using the source base station may be transmitted by using the target base station, thereby reducing a data transmission delay in the handover process and ensuring data transmission reliability.

Embodiment 2

In a handover process, for downlink data transmission, after a core network device starts a duplication process, a UPF device may send a data packet to a source base station, and send a duplicate of the data packet to a target base station. The source base station sends the data packet received from the UPF device to a user equipment, and the target base station sends the data packet received from the UPF device to the user equipment. After separately receiving the data packet from the source base station and the target base station, the UE needs to perform operations such as duplicate packet detection, data packet reordering, and/or in-order delivery on the data packets received from the source base station and the target base station, so that the UE can correctly perform duplicate packet detection, data packet reordering, or in-order delivery.

A person skilled in the art may understand that, in this application, the source base station or the target base station serves as an access network device. During uplink or downlink transmission, in a process in which the source base station or the target base station sends a data packet received from the core network device to the UE or sends a data packet received from the UE to the core network device, the source base station or the target base station may perform necessary processing, for example, operations such as packet header processing and reordering, on the data packet, or may transparently transmit the data packet. For ease of description, this is not limited in this application when related technologies are used, unless otherwise specified.

Figure 3:
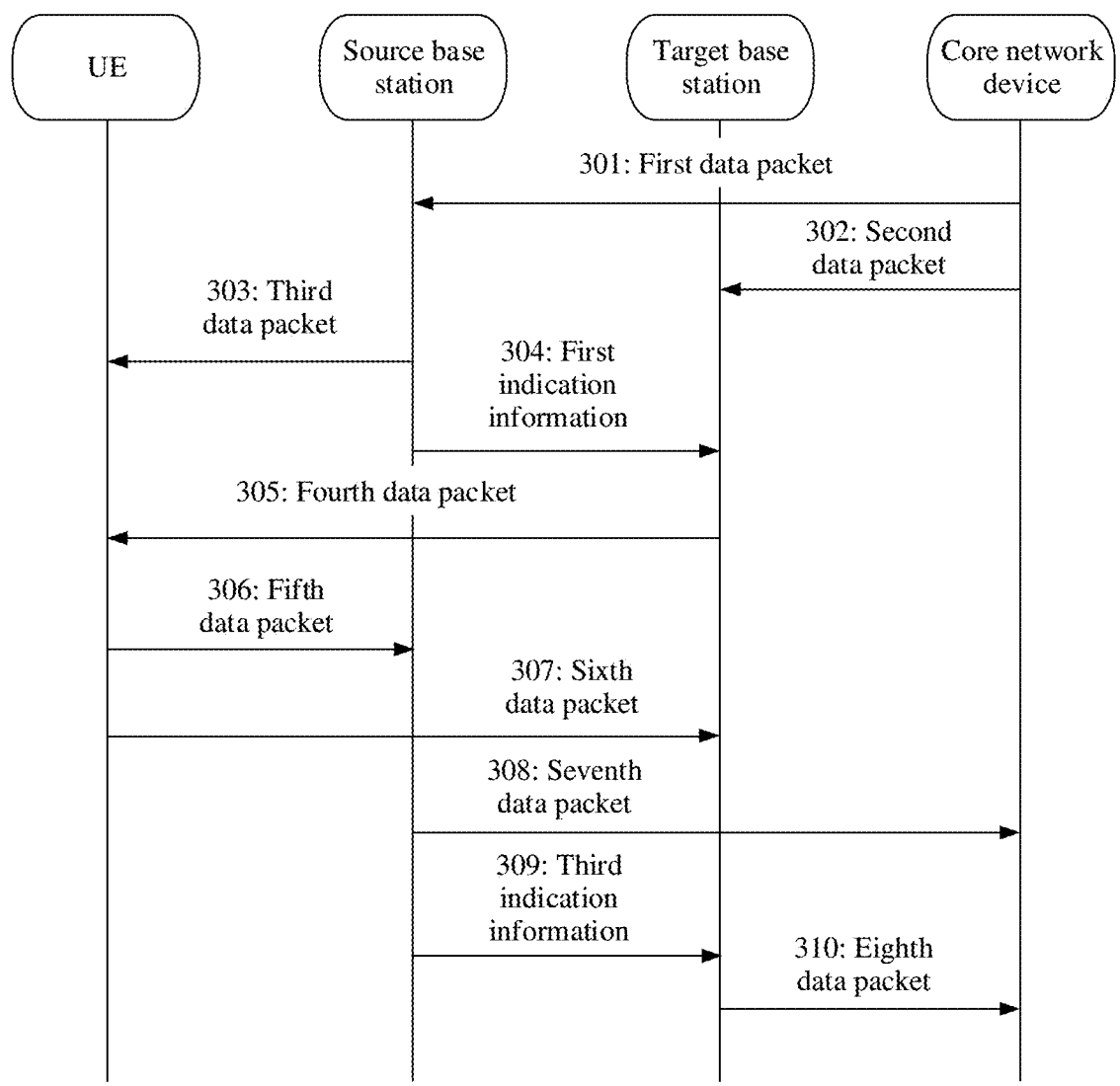
FIG. 3 is a flowchart of another communication method according to an embodiment of the present invention.

As shown in FIG. 3, a solution provided in this embodiment includes the following steps.

Step 301: The source base station receives a first data packet from the core network device.

Optionally, the core network device may be the UPF device.

Step 302: The target base station receives a second data packet from the core network device, where the second data packet is a duplicate of the first data packet, and the first data packet and the second data packet each include a first index.

A value of a first index included in the first data packet is the same as a value of a first index included in the second data packet. For the first data packet and the second data packet, at least payloads (payload) are the same. In this application, a data packet and a duplicate of the data packet may be completely the same. Alternatively, a data packet and a duplicate of the data packet may carry a same payload, but other information, for example, packet headers, is different. In some implementations, the first index is a higher layer sequence number. For example, the first index may be a GPRS tunneling protocol-user plane (GTP-U) sequence number (SN). Alternatively, the first index may be a sequence number of an upper-layer protocol stack of a GTP-U protocol layer. For example, the first index may be a transmission control protocol (TCP) sequence number or a sequence number of another upper-layer protocol layer of the GTP-U protocol layer. This is not limited in this embodiment of the present invention. Alternatively, a new protocol layer may be introduced into an existing protocol stack, and the first index may be a protocol layer sequence number corresponding to the newly introduced protocol layer. In an example, a protocol layer is newly introduced into an upper layer of a GTP-U protocol layer. For example, the newly introduced protocol layer is a high reliability protocol layer (HRP). The first index may be an HRP sequence number. This is not limited in this embodiment of the present invention. It should be noted that, the newly introduced protocol layer may have another naming or representation form. This is not limited in this embodiment of the present invention.

Optionally, the value of the first index is at a quality of service (QoS) flow granularity. To be specific, first indexes included in data packets respectively corresponding to different QoS flows are separately numbered independently. Optionally, values of the first indexes included in the data packets respectively corresponding to the different QoS flows may be the same or different. This is not limited in this embodiment of the present invention. The QoS flow may be at a data radio bearer (DRB) granularity. To be specific, only one QoS flow can be mapped to a same DRB, and different QoS flows are mapped to different DRBs. Therefore, the value of the first index may alternatively be at the DRB granularity.

Step 303: The source base station sends a third data packet to the user equipment in response to the first data packet, where the third data packet includes a second index.

Optionally, the second index may be a packet data convergence protocol (PDCP) sequence number. In this embodiment, at least content of data carried in the first data packet and content of data carried in the third data packet are the same, but packet header information may be the same or different. For example, for the first data packet and the third data packet, at least payloads (for example, payloads) are the same, but packet header information included in the first data packet is the same as or different from packet header information included in the third data packet. In an example, the third data packet includes a PDCP SN, but the first data packet includes no PDCP SN. In addition, the packet header information may alternatively have other differences. Details are not described herein.

Step 304: The source base station sends first indication information to the target base station, where the first indication information indicates a mapping relationship between the first index and the second index corresponding to the first index.

In this embodiment, there is no strict sequence of step 303 and step 304. For example, step 303 may be performed before step 304, or step 304 may be performed before step 303, or steps 303 and 304 are performed simultaneously.

In a possible implementation, for downlink data, when the UPF device does not start a duplication operation, a packet header of the data packet sent by the UPF device to the source base station carries the first index. For example, a GTP-U packet header carries a GTP-U SN. Before the handover process occurs, when the source base station performs downlink (DL) data transmission (sometimes also referred to as DL data transmission) with the UE, the mapping relationship between the first index and the second index corresponding to the first index has been determined. For example, a mapping relationship between the PDCP SN and the GTP-U SN is determined. To ensure that a mapping relationship used by the source base station is consistent with a mapping relationship used by the target base station, the source base station may send the determined DL mapping relationship, namely, the first indication information, between the first index and the second index corresponding to the first index to the target base station by using a handover request message. Optionally, the first indication information may alternatively be sent to the target base station by using another message. This is not limited.

In another possible implementation, for downlink data, when the UPF device does not start a duplication operation, a packet header of the data packet sent by the UPF device to the source base station carries no first index. For example, a GTP-U packet header carries no GTP-U SN. When the UPF device starts the duplication operation, the packet header of the data packet sent by the UPF device to the source base station carries the first index. For example, starting from the $1^{st}$ duplication packet, the UPF device uses GTP-U packet headers of duplication packets to carry GTP-U SNs. That is, before the handover process occurs, when the source base station performs DL data transmission with the UE, the data packet includes no GTP-U SN. That is, the source base station cannot determine the mapping relationship between the first index and the second index corresponding to the first index. For a downlink, a GTP-U packet header carries a GTP-U SN only when the UPF device sends a first duplication data packet. When the UPF device is to send the first duplication packet to the source base station, the UPF device may first send a piece of indication information, for example, an end marker, to the source base station. Alternatively, a packet header of the first duplication data packet sent by the UPF device to the source base station carries a piece of indication information. The foregoing indication information is used to notify the source base station that the UPF device starts to send duplication data packets. After receiving the first duplication data packet sent by the UPF device, the source base station can determine a DL mapping relationship between the GTP-U SN and the PDCP SN, and send the mapping relationship to the target base station. Specifically, the mapping relationship may be sent by using a newly defined Xn message (a message transmitted between two base stations) or by reusing an existing Xn message, for example, an existing SN status transfer message. This is not limited in this embodiment of the present invention. After receiving the mapping relationship, the target base station starts to send a DL duplication data packet received from the UPF device to the UE. If the target base station receives, before learning of the mapping relationship, the data packet sent by the UPF device, the target base station buffers the data packet.

Step 305: The target base station sends a fourth data packet to the user equipment in response to the second data packet, where the third data packet and the fourth data packet each include the second index.

In this embodiment, at least content of data carried in the second data packet and content of data carried in the fourth data packet are the same, but packet header information may be the same or different. For example, for the second data packet and the fourth data packet, at least payloads (for example, payloads) are the same, but packet header information included in the second data packet may be the same as or different from packet header information included in the fourth data packet. In an example, the fourth data packet includes a PDCP SN, but the second data packet includes no PDCP SN. Other differences are not described herein.

The mapping relationship between the first index and the second index corresponding to the first index may be indicated in a plurality of manners. The following provides several possible implementations.

Manner 1:

The first indication information includes a value of the first index and a value of the second index corresponding to the first index.

For example, if a GTP-U SN carried in a data packet received by the source base station from the UPF device is 1, and the source base station determines, based on a current data transmission status, that a PDCP SN corresponding to the data packet is 2, the mapping relationship indicated by the first indication information may be shown in Table 1 below.

TABLE 1

| DL GTP-U SN | DL PDCP SN |
|---|---|
| 1 | 2 |

The first indication information includes DL {GTP-U SN, PDCP SN}. A sequence of the GTP-U SN and the PDCP SN may be changed, for example, as shown in Table 2. This is not limited in this embodiment of the present invention.

TABLE 2

| DL PDCP SN | DL GTP-U SN |
|---|---|
| 2 | 1 |

Specific values of the GTP-U SN and the PDCP SN may be specifically determined by the source base station based on the received data packet. In another possibility, in addition to receiving, from the UPF device, the data packet carrying the GTP-U SN of 1, the source base station further receives, from the UPF device, data packets carrying GTP-U SNs of 2, 3, and the like. The source base station determines, based on the current data transmission status, that a PDCP SN corresponding to the data packet carrying the GTP-U SN of 2 is 3, that a PDCP SN corresponding to the data packet carrying the GTP-U SN of 3 is 4, and so on. Details are not described again. In this case, the mapping relationship indicated by the first indication information may also be shown in Table 3 below.

TABLE 3

| DL GTP-U SN | DL PDCP SN |
|---|---|
| 2 | 3 |

In this embodiment, optionally, a value of a specific sequence number carried in the first indication information is not specifically limited, provided that the mapping relationship between the first index and the second index corresponding to the first index can be indicated.

Manner 2:

The first indication information includes a mapping formula of the first index and the second index corresponding to the first index.

For example, the first indication information carries a formula PDCPSN=GTP-USN+delta. A specific value of delta may be flexibly determined by the source base station based on a specific data transmission status. Optionally, delta may be any natural number. Alternatively, PDCP SN=GTP-U SN−delta. A specific expression manner to be used may be flexibly determined by the source base station.

Manner 3:

The first indication information includes a difference between values respectively corresponding to the first index and the second index corresponding to the first index.

For example, the first indication information carries a difference, for example, delta 1, between two indexes. A specific value of delta 1 may be flexibly determined by the source base station based on a specific data transmission status. Optionally, delta 1 may be any natural number.

In this manner, after receiving the first indication information, the target base station may learn of, based on delta 1, that PDCP SN=GTP-U SN+delta 1 or PDCP SN=GTP-U SN−delta 1. A specific expression manner to be used may be flexibly determined by the source base station.

In this embodiment, after receiving the third data packet from the source base station and the fourth data packet from the target base station, the user equipment performs operations such as duplicate packet detection, data packet reordering, and/or in-order delivery on the third data packet and the fourth data packet. Because a mapping relationship used by the source base station is the same as that used by the target base station, it is ensured that, the user equipment can correctly perform duplicate packet detection, data packet reordering, or in-order delivery on the duplication data packets separately received from the source base station and the target base station.

The foregoing embodiment is for the downlink data transmission. The following provides another solution for uplink data transmission. The uplink transmission solution and the downlink transmission solution may be separately implemented, or may be combined and applied to a same system.

For an uplink, the method provided in this embodiment includes the following steps.

Step 306: The source base station receives a fifth data packet from the UE.

Step 307: The target base station receives a sixth data packet from the UE, where the sixth data packet is a duplicate of the fifth data packet, and the fifth data packet and the sixth data packet each include a third index. A value of a third index included in the fifth data packet is the same as a value of a third index included in the sixth data packet. For the fifth data packet and the sixth data packet, at least payloads (for example, payloads) are the same. The third index may be a PDCP SN.

It should be noted that, at least the payloads (for example, the payloads) of the fifth data packet and the sixth data packet are the same, but other information carried in the two data packets may be the same or different. In an example, address information carried in the two data packets is different. For example, the fifth data packet carries address information of the source base station, and the sixth data packet carries address information of the target base station. Other differences are not described herein.

Step 308: The source base station sends a seventh data packet to the core network device in response to the fifth data packet, where The core network device may be the UPF device, and the seventh data packet includes a fourth index.

In this embodiment, content of data carried in the fifth data packet and content of data carried in the seventh data packet are the same, but packet header information may be the same or different.

For example, for the fifth data packet and the seventh data packet, at least payloads (for example, payloads) are the same, but packet header information included in the fifth data packet may be the same as or different from packet header information included in the seventh data packet.

In an example, the seventh data packet includes a higher layer sequence number (namely, the fourth index). For example, the higher layer sequence number may be a GTP-USN. Alternatively, the higher layer sequence number may be a sequence number of an upper-layer protocol stack of a GTP-U protocol layer. For example, the higher layer sequence number may be a TCP SN or a protocol layer sequence number of another upper layer of the GTP-U protocol layer. This is not limited in this embodiment of the present invention. Alternatively, a new protocol layer may be introduced into an existing protocol stack. The higher layer sequence number may be a protocol layer sequence number of the newly introduced protocol layer. In a possible implementation, a new protocol layer is newly introduced to an upper layer of the GTP-U protocol layer. For example, the newly introduced protocol layer is a high reliability protocol layer (HRP), and the higher-layer sequence number may be an HRP SN. This is not limited in this embodiment of the present invention. It should be noted that, the newly introduced protocol layer may have another naming or representation form. This is not limited in this embodiment of the present invention.

Optionally, at least the payloads of the fifth data packet and the seventh data packet are the same, but the fifth data packet does not include the higher layer sequence number. Other differences are not described herein.

Step 309: The source base station sends third indication information to the target base station, where the third indication information indicates a mapping relationship between the third index and the fourth index corresponding to the third index.

Optionally, step 309 may be performed before step 308 or after step 308. Alternatively, step 309 and step 308 may be performed simultaneously. This is not limited in this embodiment of the present invention.

Specifically, for the third indication information, in a possible implementation, for uplink data, when the UE does not start the duplication operation, after receiving a data packet sent by the UE, the source base station performs necessary processing on a packet header of the data packet. For example, the source base station carries the fourth index by using the packet header of the data packet. For example, the source base station carries the GTP-U SN by using a GTP-U packet header of the data packet. In this case, before the handover process occurs, for example, before, during, or after the source base station and the UPF device perform UL duplication data packet transmission, the mapping relationship between the third index and the fourth index corresponding to the third index may be determined. For example, a mapping relationship between the PDCP SN and the GTP-U SN may be determined. To ensure that a mapping relationship used by the source base station is consistent with a mapping relationship used by the target base station, the source base station may send the determined UL mapping relationship, namely, the third indication information, between the third index and the fourth index corresponding to the third index to the target base station by using a handover request message. Optionally, the third indication information may alternatively be sent to the target base station by using another message. This is not limited in this embodiment of the present invention.

For the third indication information, in another possible implementation, for uplink data, when the UE does not start the duplication operation, after the source base station receives a data packet sent by the UE, the source base station does not carry the fourth index by using a packet header of the data packet. For example, a GTP-U packet header does not carry the GTP-U SN. After the UE starts the duplication operation, after the source base station receives a first duplication data packet that the UE starts to send, the source base station carries the fourth index by using a packet header of the data packet. For example, the source base station carries the GTP-U SN by using a GTP-U packet header. To be specific, before the handover process occurs, when the source base station performs UL data transmission with the UE, a data packet sent by the source base station to the UPF device does not include the GTP-U SN. That is, the source base station cannot determine the mapping relationship between the third index and the fourth index corresponding to the third index. For an uplink, after the source base station receives the first duplication data packet sent by the UE, the source base station carries the GTP-U SN by using a GTP-U packet header of the received duplication data packet. When the UE is to send the first duplication packet to the source base station, the UE first sends a piece of indication information, for example, an end marker, to the source base station, or a packet header of the first duplication data packet sent by the UE to the source base station carries a piece of indication information. The indication information is used to notify the source base station that the UE starts to send duplication data packets. After the source base station receives the first duplication data packet sent by the UE, the source base station may determine a UL mapping relationship between the GTP-U SN and the PDCP SN, and send the mapping relationship to the target base station. Specifically, the mapping relationship may be sent by using a newly defined Xn message or reusing an existing Xn message, for example, an SN status transfer message. This is not limited in this embodiment of the present invention. After receiving the mapping relationship, the target base station sends the UL duplication data packets received from the UE to the UPF device.

The mapping relationship between the third index and the fourth index corresponding to the third index may be indicated in a plurality of manners. The following provides several optional manners.

Manner 1:

The third indication information includes a value of the third index and a value of the fourth index corresponding to the third index.

For example, if a PDCP SN carried in a data packet received by the source base station from the UE is 5, and the source base station determines, based on a current data transmission status, that a GTP-U SN corresponding to the data packet is 3, the mapping relationship indicated by the third indication information may be shown in Table 4 below.

TABLE 4

| UL GTP-U SN | UL PDCP SN |
| --- | --- |
| 3 | 5 |

The third indication information includes UL {GTP-U SN, PDCP SN}. A sequence of the GTP-U SN and the PDCP SN may be changed, for example, as shown in Table 5. This is not limited in this embodiment of the present invention.

TABLE 5

| UL PDCP SN | UL GTP-U SN |
| --- | --- |
| 5 | 3 |

Specific values of the GTP-U SN and the PDCP SN may be specifically determined by the source base station based on a received data packet. For example, in another possibility, in addition to receiving, from the UE, the data packet carrying the PDCP SN of 5, the source base station further receives, from the UE, data packets carrying PDCP SNs of 2, 3, and 6. The source base station determines, based on the current data transmission status, that a GTP-U SN corresponding to the data packet carrying the PDCP SN of 2 is 0, that a GTP-U SN corresponding to a data packet carrying the PDCP SN of 3 is 1, that a GTP-U SN corresponding to a data packet carrying the PDCP SN of 6 is 4, and so on. Details are not described. In this case, the mapping relationship indicated by the third indication information may also be shown in Table 6 below.

TABLE 6

| UL GTP-U SN | UL PDCP SN |
| --- | --- |
| 1 | 3 |

In this embodiment, optionally, a value of a specific sequence number carried in the third indication information is not specifically limited, provided that the mapping relationship between the third index and the fourth index corresponding to the third index can be indicated.

Manner 2:

The third indication information includes a mapping formula of the third index and the fourth index corresponding to the third index.

For example, the third indication information carries a formula PDCPSN=GTP-USN+delta'. A specific value of delta' may be flexibly determined by the source base station based on a specific data transmission status. Optionally, delta' may be any natural number. Alternatively, PDCP SN=GTP-U SN−delta'. A specific expression manner to be used may be flexibly determined by the source base station. Optionally, delta included in the first indication information may be the same as or different from delta' included in the third indication information. This is not limited in this embodiment of the present invention.

Manner 3:

The third indication information includes a difference between values respectively corresponding to the third index and the fourth index corresponding to the third index.

For example, the third indication information carries a difference, for example, delta 2, between two indexes. A specific value of delta 2 may be flexibly determined by the source base station based on a specific data transmission status. Optionally, delta 2 may be any natural number.

In this manner, after receiving the third indication information, the target base station may learn of, based on delta 2, that PDCP SN=GTP-U SN+delta 2. Alternatively, PDCP SN=GTP-U SN−delta 2. A specific expression manner to be used may be flexibly determined by the source base station.

Optionally, delta 1 in the first indication information may be the same as or different from delta 2 included in the third indication information. This is not limited in this embodiment of the present invention.

In the foregoing embodiment, the UL mapping relationship between the GTP-U SN and the PDCP SN corresponding to the GTP-U SN and the DL mapping relationship between the GTP-U SN of and the PDCP SN corresponding to the GTP-U SN may be included in a same piece of indication information or different indication information. This is not limited in this embodiment of the present invention. Optionally, the mapping relationship between the first index and the second index and the mapping relationship between the third index and the fourth index, namely, the UL mapping relationship and the DL mapping relationship, may be carried by using a same Xn message or different Xn messages. For example, the Xn message may be a handover request message or an SN status transfer message. This is not limited in this embodiment of the present invention. Optionally, a specific UL mapping relationship may be the same as or different from a specific DL mapping relationship. This is not limited in this embodiment of the present invention.

Step 310: The target base station sends an eighth data packet to the core network device in response to the sixth data packet, where the seventh data packet and the eighth data packet each include the fourth index.

The core network device may be the UPF device.

The fourth index is the higher layer sequence number. For example, the fourth index may be the GTP-USN. Alternatively, the fourth index may be the sequence number of the upper-layer protocol stack of the GTP-U protocol layer. For example, the fourth index may be the TCP SN or the protocol layer sequence number of the another upper layer of the GTP-U protocol layer. This is not limited in this embodiment of the present invention. Alternatively, the new protocol layer may be introduced into the existing protocol stack. The fourth index may be the protocol layer sequence number corresponding to the newly introduced protocol layer. In an example, the protocol layer is newly introduced to the upper layer of the GTP-U protocol layer. For example, the newly introduced protocol layer is the high reliability protocol layer (HRP), and the fourth index may be the HRP SN. This is not limited in this embodiment of the present invention. It should be noted that, the newly introduced protocol layer may have the another naming or representation form. This is not limited in this embodiment of the present invention. Optionally, the value of the fourth index is at a quality of service (QoS) flow granularity. To be specific, fourth indexes included in data packets respectively corresponding to different QoS flows are separately numbered independently. Optionally, values of the fourth indexes included in the data packets respectively corresponding to the different QoS flows may be the same or different. This is not limited in this embodiment of the present invention. The QoS flow may be at a data radio bearer (DRB) granularity. To be specific, only one QoS flow can be mapped to a same DRB, and different QoS flows are mapped to different DRBs. Therefore, the value of the fourth index may alternatively be at the DRB granularity.

In this embodiment, at least content of data carried in the sixth data packet and content of data carried in the eighth data packet are the same, but packet header information may be the same or different. For example, for the sixth data packet and the eighth data packet, at least payloads (for example, payloads) are the same, but packet header information included in the sixth data packet are the same as or different from packet header information included in the eighth data packet. In an example, the eighth data packet includes the fourth index, but the sixth data packet includes no fourth index. Other differences are not described herein.

In this embodiment, after receiving the seventh data packet from the source base station and the eighth data packet from the target base station, the UPF device performs operations such as duplicate packet detection, data packet reordering, and/or in-order delivery on the seventh data packet and the eighth data packet. Because a mapping relationship used by the source base station is the same as that used by the target base station, it is ensured that, the UPF device can correctly perform duplicate packet detection, data packet reordering, or in-order delivery on the duplication data packets separately received from the source base station and the target base station.

In an existing handover procedure, the source base station may send the SN status transfer message to the target base station. Specifically, for the uplink data transmission, the SN status transfer message indicates an SN of the first lost uplink data packet and a receiving status of an uplink data packet that needs to be retransmitted by the UE on the target base station. For the downlink, the SN status transfer message indicates that when the target base station needs to allocate a PDCP SN to a downlink data packet that is newly received from the UPF device and to which no PDCP SN is allocated, a value of a start PDCP SN allocated by the target base station (that is, a value of a PDCP SN from which the target base station allocates a sequence number).

For any one of the foregoing embodiments, optionally, the source base station does not need, by default, to send the SN status transfer message to the target base station. For the UL data transmission, because the target base station determines a value of a GTP-U SN based on a PDCP SN and a UL mapping relationship that is between a GTP-U SN and a PDCP SN corresponding to the GTP-U SN and that is notified by the source base station, the source base station may not perform an SN status transfer procedure. For the DL data transmission, the target base station determines a value of a PDCP SN based on a GTP-U SN in a GTP-U packet header of a data packet and a DL mapping relationship that is between a GTP-U SN of and a PDCP SN corresponding to the GTP-U SN and that is notified by the source base station. Therefore, the source base station may not send the SN status transfer message to the target base station. Alternatively, optionally, after the core network device starts the duplication process, the core network device, such as the UPF device, may notify the source base station whether the SN status transfer message needs to be sent in the handover process. For example, when the UPF device starts duplication packet sending (For example, after a tunnel that is used to transmit the duplication data packets and that is between the target base station and the AMF device, the SMF device, or the UPF device is successfully established). The UPF device may send an indication message to the source base station. For example, the indication information may be an end marker, or the indication information is the indication information included in the packet header of the first duplication data packet sent by the UPF device to the source base station. For example, the indication information included in the packet header of the first duplication data packet sent by the source base station is a binary value "0" or "1", "1" indicates that the source base station needs to send the SN status transfer message to the target base station, and "0" indicates that the source base station does not need to send the SN status transfer message to the target base station. A specific form of the indication information is not limited in this embodiment of the present invention.

In this embodiment, the first duplication data packet may be one or more data packets. For example, the first duplication data packet is the $1^{st}$ data packet, the first group of data packets, or the $1^{st}$ data packet in the first group of data packets sent by the UE to the source base station or the target base station after the UE starts the duplication process. Alternatively, the first duplication data packet is the $1^{st}$ data packet, the first group of data packets, or the $1^{st}$ data packet in the first group of data packets sent by the core network device to the source base station or the target base station after the core network device starts the duplication process. This is not limited in this embodiment of the present invention.

Embodiment 3

To reduce a data forwarding delay in a handover process, Embodiment 1 and Embodiment 2 provide the solution in which the user equipment and/or the core network device start/starts duplication. Therefore, the source base station may not forward data to the target base station. For example, for uplink transmission, the source base station does not forward out-of-order uplink data packets received from the user equipment to the target base station. The out-of-order uplink data packets may include the first out-of-order UL data packet and all other data packets (if existent) after the first out-of-order packet. For a downlink, the source base station does not forward, to the target base station, a downlink data packet that has been sent to the user equipment but whose reception is not acknowledged by the user equipment as a success and a data packet that is newly sent by the core network device to the source base station, thereby reducing the data transmission delay in the handover process. For the downlink data transmission, because a tunnel between a core network and the target base station has been established before a source link deteriorates, even if data forwarding is not performed between the source base station and the target base station, the UPF device may back up/duplicate downlink data packets that cannot be forwarded by the source base station to the target base station, and send the data packets to the target base station, thereby reducing a packet loss rate during downlink data transmission. However, for the uplink data transmission, this embodiment provides a solution to an uplink data transmission problem caused by no data forwarding (data forwarding) procedure between the source base station and the target base station.

Figure 4:
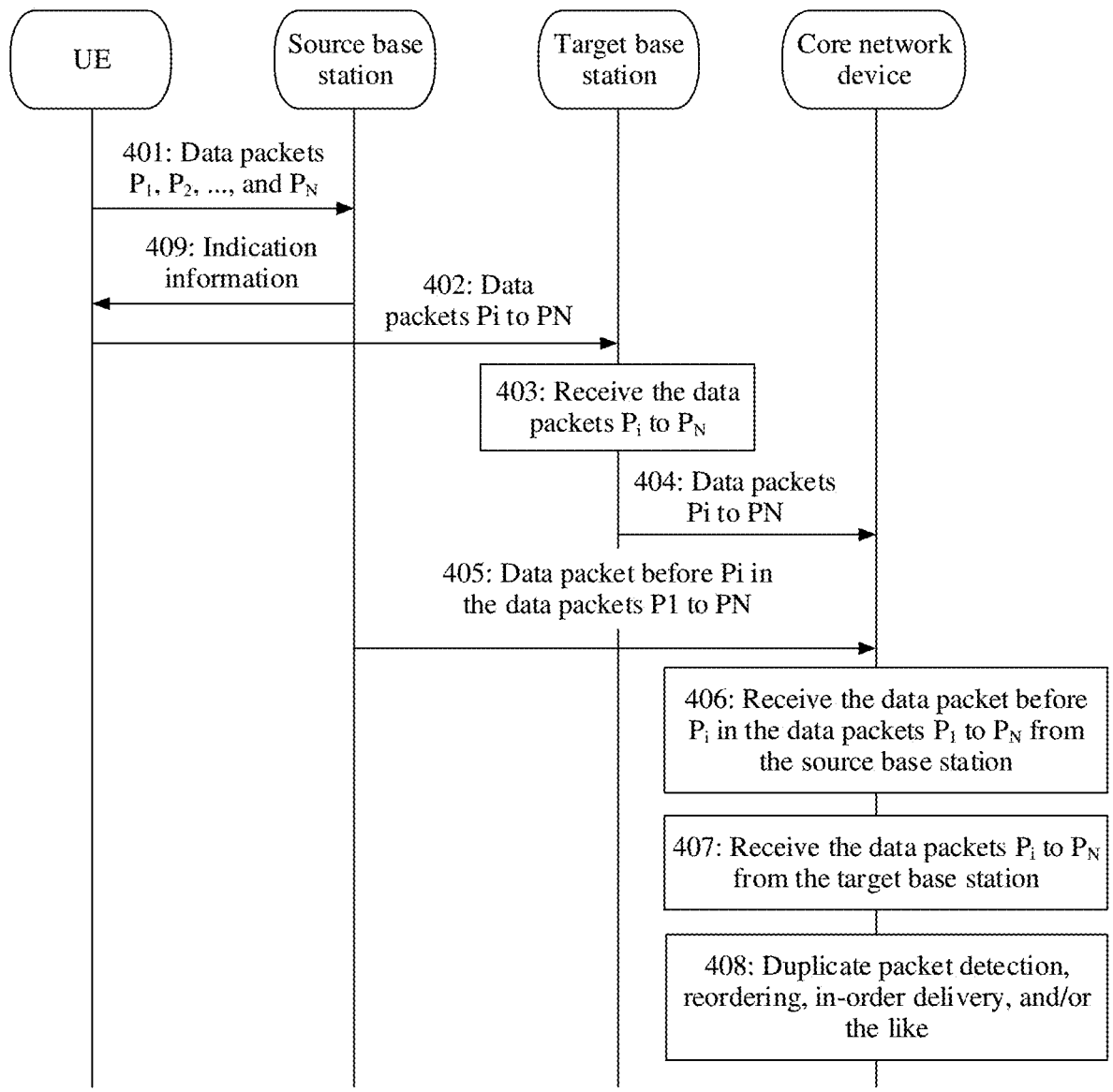
FIG. 4 is a flowchart of an uplink data transmission method according to an embodiment of the present invention.

As shown in FIG. 4, the solution includes the following steps.

Step 401: The user equipment sends data packets $P_1$, $P_2, \ldots,$ and $P_N$ to the source base station.

Optionally, with reference to the foregoing Embodiment 2, the data packets $P_1, P_2, \ldots,$ and $P_N$ include third indexes, for example, PDCP SNs.

Step 402: The user equipment sends data packets $P_i$ to $P_N$ to the target base station, where the data packet $P_i$ is the $1^{st}$ data packet not correctly received by the source base station in the data packets P1 to PN, N is an integer greater than or equal to 1, and i is an integer greater than or equal to 1 and less than or equal to N.

Optionally, with reference to the foregoing Embodiment 2, the data packets $P_i$ to $P_N$ include third indexes, for example, PDCP SNs.

If the UE receives, from the source base station, no acknowledgment ACK of the data packet $P_i$ (for example, no ACK of the data packet $P_i$ is received within a preset time), or receives, from the source base station, a negative acknowledgment NACK of the data packet $P_i$, and the UE receives acknowledgments ACKs of all data packet before $P_i$ in the data packets $P_1$ to $P_N$, the UE determines that the data packet $P_i$ is the $1^{st}$ data packet not correctly received by the source base station in the data packets $P_1$ to $P_N$.

Step 403: The target base station receives the data packets $P_i$ to $P_N$.

In this embodiment, optionally, the third indexes respectively included in the data packets P1 to PN are continuously increasing.

Step 404: The target base station sends the data packets $P_i$ to $P_N$ to the core network device.

Optionally, with reference to the foregoing Embodiment 2, the target base station determines, based on a mapping relationship between a third index and a fourth index corresponding to the third index, for example, a mapping relationship between a PDCP SN and a GTP-U SN, fourth indexes respectively included in packet headers of the data packets $P_i$ to $P_N$.

The fourth index is a higher layer sequence number. For example, the fourth index may be a GTP-USN. Alternatively, the fourth index may be a sequence number of an upper-layer protocol stack of a GTP-U protocol layer. For example, the fourth index may be a TCP SN or a protocol layer sequence number of another upper layer of the GTP-U protocol layer. This is not limited in this embodiment of the present invention. Alternatively, a new protocol layer may be introduced into an existing protocol stack. The fourth index may be a protocol layer sequence number corresponding to the newly introduced protocol layer. In an example, a protocol layer is newly introduced to an upper layer of the GTP-U protocol layer. For example, the newly introduced protocol layer is a high reliability protocol layer (High Reliability Protocol, HRP), and the fourth index may be an HRP SN. This is not limited in this embodiment of the present invention. It should be noted that, the newly introduced protocol layer may have another naming or representation form. This is not limited in this embodiment of the present invention. Optionally, a value of the fourth index is at a quality of service (QoS) flow granularity. To be specific, fourth indexes included in data packets respectively corresponding to different QoS flows are separately numbered independently. Optionally, values of the fourth indexes included in the data packets respectively corresponding to the different QoS flows may be the same or different. This is not limited in this embodiment of the present invention. The QoS flow may be at a data radio bearer (DRB) granularity. To be specific, only one QoS flow can be mapped to a same DRB, and different QoS flows are mapped to different DRBs. Therefore, the value of the fourth index may alternatively be at the DRB granularity.

Optionally, the target base station in step 404 may obtain, from the source base station, the mapping relationship between the third index and the fourth index corresponding to the third index.

Step 405: The source base station sends the data packets before $P_i$ in the data packets $P_1$ to $P_N$ to the core network device.

Optionally, with reference to the foregoing Embodiment 2, the source base station determines, based on the mapping relationship between the third index and the fourth index corresponding to the third index, for example, the mapping relationship between the PDCP SN and the GTP-U SN, fourth indexes respectively included in packet headers of all the data packets before $P_i$ in the data packets $P_1$ to $P_N$.

A sequence of steps 404 and 405 is not limited. For example, step 404 may be performed before step 405, or step 405 may be performed before step 404, or steps 404 and 405 are performed simultaneously.

Optionally, the foregoing method further includes the following steps.

Step 406: The core network device receives all the data packets before $P_i$ in the data packets $P_1$ to $P_N$ from the source base station.

Step 407: The core network device receives the data packets $P_i$ to $P_N$ from the target base station.

Step 408: The core network device performs operations such as duplicate packet detection, reordering, and/or in-order delivery based on fourth indexes included in the data packets $P_1$ to $P_N$.

The following uses several examples to further describe the foregoing solution:

Example 1

Before the UE is successfully handed over to the target base station (a connection between the UE and the target base station is not successfully established yet), the UE sends data packets P1, P2, P3, P4, P5, P6, and P7 to the source base station, where PDCP SNs of the data packets P1 to P7 are continuously increasing.

The data packets P1, P2, P3, P6, and P7 are correctly received by the source base station (feedbacks received by the UE from the source base station respectively on the data packets P1, P2, P3, P6, and P7 are acknowledgments (ACK)). The packets P4 and P5 are not correctly received by the source base station (the UE receives no feedback, from the source base station, on the data packets P4 and P5, or feedbacks, received by the UE from the source base station, on the data packets P4 and P5 are negative acknowledgments (NACK)).

Because the source base station does not correctly receive the data packets P4 and P5, although the data packets P6 and P7 are correctly received, the source base station may determine that the data packets P6 and P7 are out-of-order data packets.

In this case, after establishing a radio resource control (RRC) connection to the target base station, the UE may send the data packets P4, P5, P6, and P7 to the target base station.

The target base station sends the data packets P4, P5, P6, and P7 to the core network device.

Optionally, the data packets P4, P5, P6, and P7 that are sent by the target base station to the core network device each include a corresponding fourth index, for example, a GTP-U SN.

The source base station sends the data packets P1, P2, and P3 to the core network device.

Optionally, the data packets P1, P2, and P3 that are sent by the source base station to the core network device each include a corresponding fourth index, for example, a GTP-U SN.

The UPF device performs, based on the fourth indexes respectively carried in the data packets P1 to P7, operations such as duplicate packet detection, reordering, and/or in-order delivery on all the data packets P1 to P7 received from the source base station and the target base station.

Example 2

Before the UE is successfully handed over to the target base station (a connection between the UE and the target base station is not successfully established yet), the UE sends data packets P1, P2, P3, P4, P5, P6, and P7 to the source base station, where PDCP SNs of the data packets P1 to P7 are continuously increasing.

The data packets P1, P2, and P3 are correctly received by the source base station (the UE receives ACKs of the data packets P1, P2, and P3). The data packets P4, P5, P6, and P7 are not correctly received by the source base station (the UE receives no feedback, from the source base station, on the data packets P4, P5, P6, and P7, or feedbacks, received by the UE, on the data packets P4, P5, P6, and P7 are NACKs).

In this case, after establishing an RRC connection to the target base station, the UE sends the data packets P4, P5, P6, and P7 to the target base station.

The target base station sends the data packets P4, P5, P6, and P7 to the core network device.

Optionally, the data packets P4, P5, P6, and P7 that are sent by the target base station to the core network device each include a corresponding fourth index, for example, a GTP-U SN.

The source base station sends the data packets P1, P2, and P3 to the core network device.

Optionally, the data packets P1, P2, and P3 that are sent by the source base station to the core network device each include a corresponding fourth index, for example, a GTP-U SN.

The UPF device performs, based on the fourth indexes respectively carried in the data packets P1 to P7, operations such as duplicate packet detection, reordering, and/or in-order delivery on all the data packets P1 to P7 received from the source base station and the target base station.

In this embodiment, optionally, before step 402, the method further includes the following step.

Step 409: The user equipment receives indication information from the source base station, where the indication information indicates the user equipment to send the data packets $P_i$ to $P_N$ to the target base station.

Optionally, the indication information is included in an RRC reconfiguration message.

Optionally, the RRC message may be an RRC reconfiguration message carrying a synchronous reconfiguration information element (reconfiguration with sync) or may be an RRC connection reconfiguration message carrying a mobility control information information element (mobility control info).

Optionally, the indication information may be generated by the source base station and sent to the UE. Alternatively, the indication information may be generated by the target base station and sent to the source base station, and the source base station transparently transmits the indication information to the UE. For example, the target base station generates the indication information. When the target base station sends a handover request acknowledgment message to the source base station, the message includes the indication information. After receiving the handover request acknowledgment message, the source base station transparently transmits the indication information to the UE by using the RRC reconfiguration message.

In this embodiment, optionally, when determining that the data packet Pi is the $1^{st}$ data packet not correctly received by the source base station in the data packets P1 to PN, the UE sends the data packets Pi to PN to the target base station by default.

The uplink transmission solution in this embodiment reduces a possibility of packet loss, and improves data transmission reliability.

Figure 5:
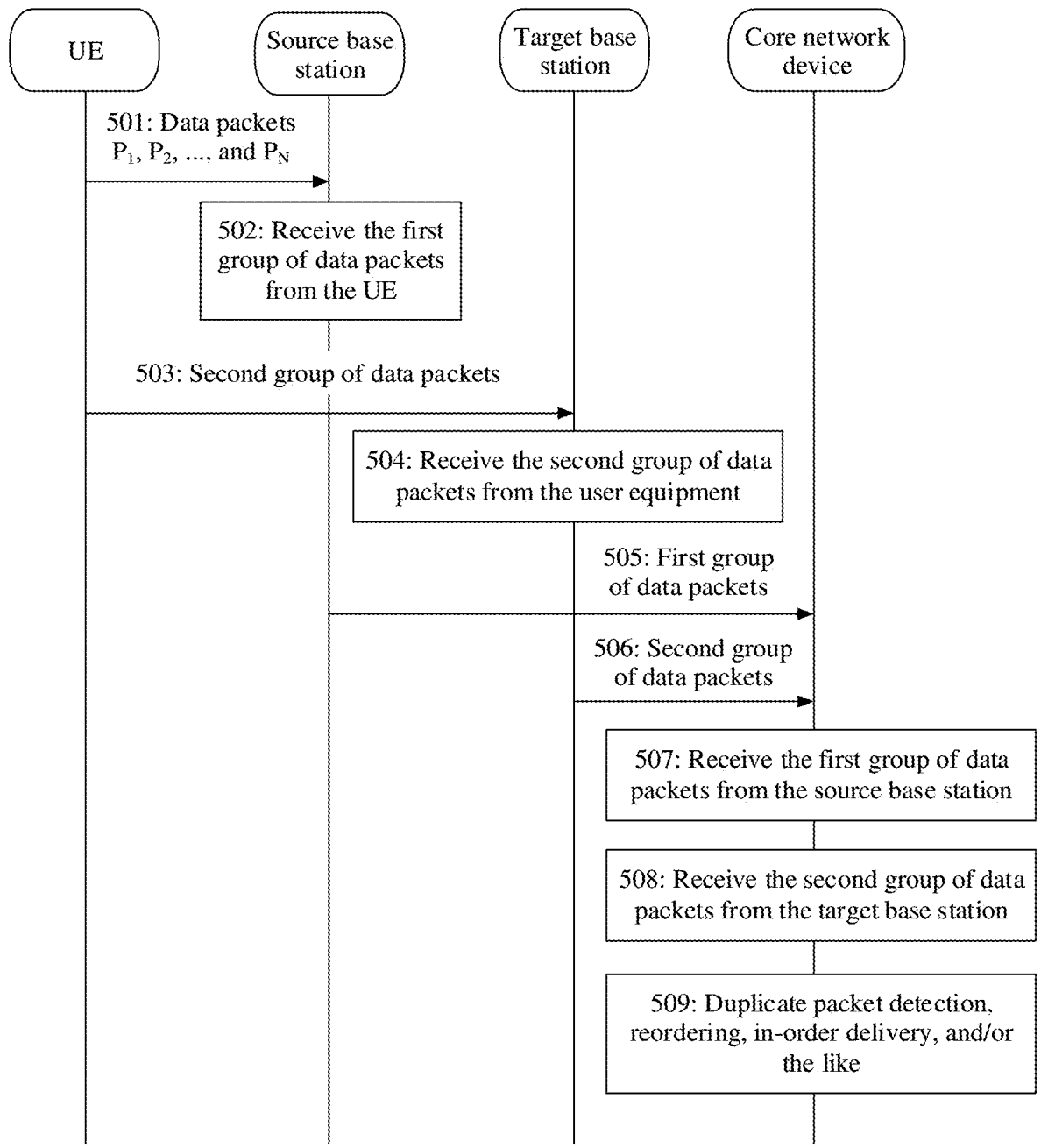
FIG. 5 is a flowchart of another uplink data transmission method according to an embodiment of the present invention.

An embodiment further provides another uplink data transmission solution. As shown in FIG. 5, the solution includes the following steps.

Step 501: A user equipment sends data packets $P_1$, $P_2$, ..., and $P_N$ to a source base station, where N is an integer greater than or equal to 1.

Optionally, with reference to the foregoing Embodiment 2, the data packets $P_1$, $P_2$, ..., and $P_N$ include third indexes, for example, PDCP SNs.

Step 502: The source base station receives the first group of data packets from the user equipment.

Optionally, the first group of data packets may include at least one of the data packets $P_1$, $P_2$, ..., and $P_N$.

Optionally, the source base station may not correctly receive a data packet from the UE. Step 502 is an optional step.

Optionally, with reference to the foregoing Embodiment 2, data packets in the first group of data packets respectively include third indexes, for example, PDCP SNs.

Step 503: The user equipment sends the second group of data packets to a target base station.

The second group of data packets is retransmitted data packets of data packets not correctly received by the source base station in the data packets $P_1, P_2, \ldots,$ and $P_N$ sent by the user equipment to the source base station. The second group of data packets includes at least one data packet.

Optionally, with reference to the foregoing Embodiment 2, the data packets in the second group of data packets respectively include third indexes.

In this embodiment, the retransmission data packet may be the foregoing data packet that is sent by the UE to the source base station and is not correctly received by the source base station, and then sent by the UE to the target base station again.

Optionally, before sending the second group of data packets to the target base station, the user equipment receives indication information from the source base station, where the indication information indicates the user equipment to send the second group of data packets to the target base station.

Optionally, the indication information may be included in an RRC reconfiguration message.

Optionally, the RRC message may be an RRC reconfiguration message carrying a synchronous reconfiguration information element (reconfiguration with sync) or may be an RRC connection reconfiguration message carrying a mobility control information information element (mobility control info).

Optionally, the indication information may be generated by the source base station and sent to the UE. Alternatively, the indication information may be generated by the target base station and sent to the source base station, and the source base station transparently transmits the indication information to the UE. For example, the target base station generates the indication information. When the target base station sends a handover request acknowledgment message to the source base station, the message includes the indication information. After receiving the handover request acknowledgment message, the source base station transparently transmits the indication information to the UE by using the RRC reconfiguration message.

Step 504: The target base station receives the second group of data packets from the user equipment.

Step 505: The source base station sends the first group of data packets to a core network device.

Optionally, the third indexes respectively included in the data packets in the first group of data packets received by the source base station may be continuous or non-continuous. When the third indexes are non-continuous, the source base station may send all correctly received data packets to the core network device.

Optionally, with reference to the foregoing Embodiment 2, the source base station determines, based on a mapping relationship between a third index and a fourth index corresponding to the third index, for example, a mapping relationship between a PDCP SN and a GTP-U SN, fourth indexes respectively included in packet headers of the data packets in the first group of data packets.

Optionally, before step 505, the source base station receives indication information from the UE, where the indication information indicates the source base station to send the first group of data packets to a UPF.

Optionally, the indication information may be included in an RRC message, a layer 1 message, or a layer 2 message. This is not limited in this embodiment.

Optionally, the RRC message may be an RRC reconfiguration complete message, or may be another message. This is not limited in this embodiment. Optionally, the indication information may be included in downlink control information (DCI). Optionally, the indication information may be included in a media access control (MAC) control element (CE) message. This is not limited in this embodiment.

Optionally, the indication information may be included in a packet header of a first duplication data packet sent by the UE to the source base station. For example, a PDCP packet header includes the indication information.

Step 506: The target base station sends the second group of data packets to the core network device.

Optionally, with reference to the foregoing Embodiment 2, the target base station determines, based on the mapping relationship between the third index and the fourth index corresponding to the third index, for example, the mapping relationship between the PDCP SN and the GTP-U SN, fourth indexes respectively included in packet headers of the data packets in the second group of data packets.

Optionally, the mapping relationship between the third index and the fourth index corresponding to the third index in step 506 is obtained from the source base station.

In this embodiment of the present invention, optionally, there is no strict time relationship between step 505 and step 506.

Optionally, the foregoing method further includes the following steps.

Step 507: The core network device receives the first group of data packets from the source base station.

Step 508: The core network device receives the second group of data packets from the target base station.

Step 509: The core network device performs operations such as duplicate packet detection, reordering, and/or in-order delivery based on fourth indexes respectively included in all data packets in the first group of data packets and the second group of data packets.

The following uses several examples to further describe the foregoing solution:

Example 1

Before the UE is successfully handed over to the target base station (an RRC connection between the UE and the target base station is not successfully established yet), the UE sends data packets P1, P2, P3, P4, P5, P6, and P7 to the source base station, where PDCP SNs of the data packets P1 to P7 are continuously increasing.

The data packets P1, P2, P3, P6, and P7 are correctly received by the source base station (the UE receives ACKs of the data packets P1, P2, P3, P6, and P7). The data packets P4 and P5 are not correctly received by the source base station (for example, the UE receives no feedback, from the source base station, on the data packets P4 and P5, or feedbacks, received by the UE, on the data packets P4 and P5 are NACKs).

In this case, after establishing the RRC connection to the target base station, the UE sends the data packets P4 and P5 to the target base station.

Optionally, the data packets P4 and P5 that are sent by the UE to the target base station each include a corresponding third index, for example, a PDCP SN.

The target base station sends the data packets P4 and P5 to the core network device.

Optionally, the data packets P4 and P5 that are sent by the target base station to the UPF each include a corresponding fourth index, for example, a GTP-U SN.

The source base station sends the data packets P1, P2, P3, P6, and P7 to the core network device.

Optionally, the data packets P1, P2, P3, P6, and P7 that are sent by the source base station to the core network device each include a corresponding fourth index, for example, a GTP-U SN.

The UPF device performs, based on the fourth indexes respectively carried in the data packets P1 to P7, operations such as duplicate packet detection, reordering, and/or in-order delivery on all the data packets P1 to P7 received from the source base station and the target base station.

Example 2

Before the UE is successfully handed over to the target base station (an RRC connection between the UE and the target base station is not successfully established yet), the UE sends data packets P1, P2, P3, P4, P5, P6, and P7 to the source base station, where PDCP SNs of the data packets P1 to P7 are continuously increasing.

The data packets P1, P2, and P3 are correctly received by the source base station (for example, the UE receives ACKs of the data packets P1, P2, and P3). The data packets P4, P5, P6, and P7 are not correctly received by the source base station (for example, the UE receives no feedback on the data packets P4, P5, P6, and P7, or feedbacks, received by the UE, on the data packets P4, P5, P6, and P7 are NACKs).

In this case, after establishing the RRC connection to the target base station, the UE sends the data packets P4, P5, P6, and P7 to the target base station.

Optionally, the data packets P4, P5, P6, and P7 that are sent by the UE to the target base station each include a corresponding third index, for example, a PDCP SN.

The target base station sends the data packets P4, P5, P6, and P7 to the core network device.

Optionally, the data packets P4, P5, P6, and P7 that are sent by the target base station to the core network device each include a corresponding fourth index, for example, a GTP-U SN.

The source base station sends the data packets P1, P2, and P3 to the core network device.

Optionally, the data packets P1, P2, and P3 that are sent by the source base station to the core network device each include a corresponding fourth index, for example, a GTP-U SN.

The UPF device performs, based on the fourth indexes respectively carried in the data packets P1 to P7, operations such as duplicate packet detection, reordering, and/or in-order delivery on all the data packets P1 to P7 received from the source base station and the target base station.

Example 3

Before the UE is successfully handed over to the target base station (an RRC connection between the UE and the target base station is not successfully established yet), the UE sends data packets P1, P2, P3, P4, P5, P6, and P7 to the source base station, where PDCP SNs of the data packets P1 to P7 are continuously increasing.

Neither of the data packets P1 to P7 is correctly received by the source base station (the UE receives no ACKs of the data packets P1 to P7, or the UE receives NACKs of the data packets P1 to P7).

In this case, after establishing the RRC connection to the target base station, the UE sends the data packets P1 to P7 to the target base station.

Optionally, the data packets P1 to P7 that are sent by the UE to the target base station each include a corresponding third index, for example, a PDCP SN.

The target base station sends the data packets P1 to P7 to the core network device.

Optionally, the data packets P1 to P7 that are sent by the target base station to the core network device each include a corresponding fourth index, for example, a GTP-U SN.

The UPF device performs, based on the fourth indexes respectively carried in the data packets P1 to P7, operations such as duplicate packet detection, reordering, and/or in-order delivery on all the data packets P1 to P7 received from the target base station.

In the uplink transmission solution in this embodiment, when the source base station does not need to forward a data packet of the UE to the target base station, a possibility of packet loss is reduced, and data transmission reliability is improved.

Figure 6:
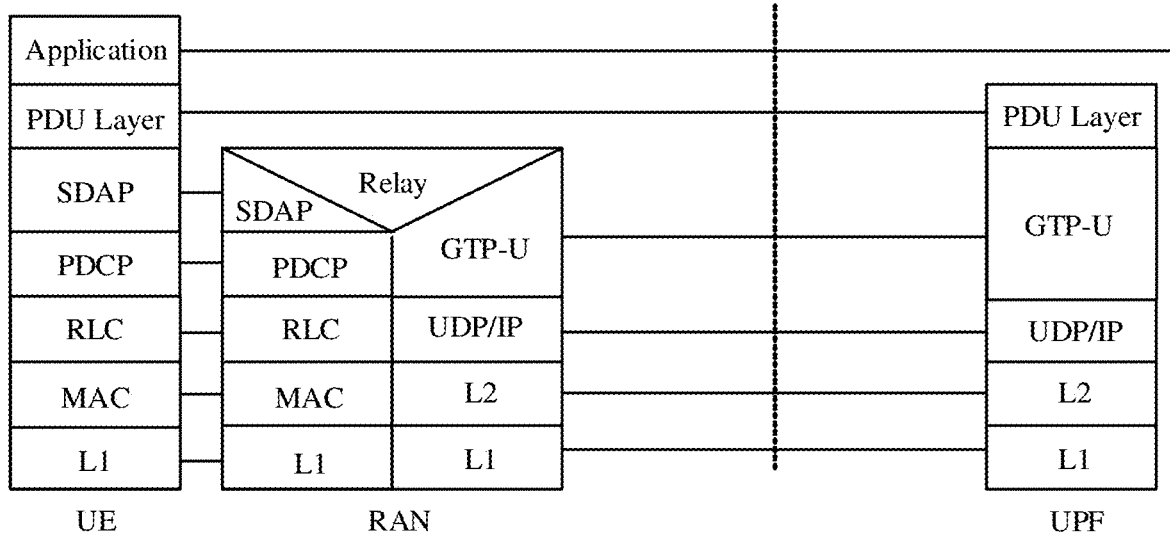
FIG. 6 is a schematic diagram of a protocol stack according to an embodiment of the present invention.

For any one of the foregoing embodiments, optionally, a corresponding user plane protocol stack architecture may be shown in FIG. 6. Specifically, a protocol stack corresponding to a core network device such as a UPF device includes a physical (PHY) layer (which may also be referred to as a layer 1, L1), a layer 2 (for example, the layer 2 includes a media access control (MAC) layer 1, a radio link control (RLC) layer, a packet data convergence protocol (PDCP) layer, and a service data adaptation protocol (SDAP) layer), a user datagram protocol/internet protocol (UDP/IP) layer, a GTP-U layer, and a protocol data unit (PDU) layer. A protocol stack corresponding to an access network device such as a source base station or a target base station includes a physical layer (PHY), a layer 2 (for example, the layer 2 includes a media access control (MAC) layer, a radio link control (RLC) layer, a packet data convergence protocol (PDCP) layer, and a service data adaptation protocol (SDAP) layer), a user datagram protocol/internet protocol (UDP/IP) layer, and a GTP-U layer. A protocol stack corresponding to a user equipment such as a UE includes a physical layer (PHY), a layer 2 (for example, the layer 2 includes a media access control (MAC) layer, a radio link control (RLC) layer, a packet data convergence protocol (PDCP) layer, and a service data adaptation protocol (SDAP) layer), a protocol data unit (PDU) layer, and an application layer.

As shown in FIG. 6, for downlink transmission, the UPF device needs to generate a sequence number at a QoS flow granularity for duplication data packets sent to the source base station and the target base station. Because a QoS flow may be at a data radio bearer (DRB) granularity, that is, only one QoS flow may be mapped to a same DRB, and different QoS flows are mapped to different DRBs, it may also be understood as that for the downlink transmission, the UPF device needs to generate a sequence number at the DRB granularity for the duplication data packets sent to the source base station and the target base station. This function is implemented by a GTP-U layer. For example, the GTP-U layer generates a GTP-U SN. For uplink transmission, the UPF device processes a sequence number at the QoS flow granularity (or the DRB granularity) for a duplication data packet separately received from the source base station and the target base station. For example, the GTP-U layer of the UPF device processes a GTP-U SN. In addition, the GTP-U layer may perform operations such as duplicate packet detection, reordering, and in-order delivery.

As shown in FIG. 6, for the downlink transmission, the source base station or the target base station needs to process a sequence number at the QoS flow granularity (or the DRB granularity) for a duplication data packet received from the core network device. For the uplink transmission, the source base station or the target base station generates a sequence number at the QoS flow granularity (or the DRB granularity) for a duplication data packet received from the UE. Specifically, for the downlink transmission, the source base station or the target base station receives the duplication data packet sent by the UPF device, and a PDCP layer of the source base station determines, based on a GTP-U SN included in a packet header of a duplication data packet, a PDCP SN corresponding to the received duplication data packet. In addition, the source base station may determine a mapping relationship between the GTP-U SN and the PDCP SN, and a PDCP layer of the target base station may determine, based on a GTP-U SN included in a packet header of a duplication data packet and a mapping relationship between a GTP-U SN and a PDCP SN (for example, the target base station receives the mapping relationship, between the GTP-U SN and the PDCP SN, sent by the source base station), a PDCP SN corresponding to the received duplication data packet. For the uplink transmission, the source base station or the target base station receives a duplication data packet sent by the UE. The source base station determines, based on a PDCP SN included in a packet header of the duplication data packet, a GTP-U SN corresponding to the received duplication data packet. For example, the GTP-U SN may be generated by a protocol layer shown in FIG. 6, namely, a GTP-U layer. In addition, the source base station may determine a mapping relationship between the GTP-U SN and the PDCP SN, and the target base station may determine, based on a PDCP SN included in a packet header of a duplication data packet and a mapping relationship between a GTP-U SN and a PDCP SN (for example, the target base station receives the mapping relationship, between the GTP-U SN and the PDCP SN, sent by the source base station), a GTP-U SN corresponding to the received duplication data packet. For example, the GTP-U SN may be generated by the GTP-U layer.

As shown in FIG. 6, for the downlink transmission, the UE needs to perform operations such as duplicate packet detection, reordering, and in-order delivery on a duplication data packet separately received from the source base station and the target base station. For example, a PDCP layer of the UE performs operations such as duplicate packet detection, reordering, and in-order delivery. For the uplink transmission, the UE generates the duplication data packets and sends the duplication data packets to the source base station and the target base station respectively. For example, the PDCP layer of the UE may generate the duplication data packets.

Figure 7:
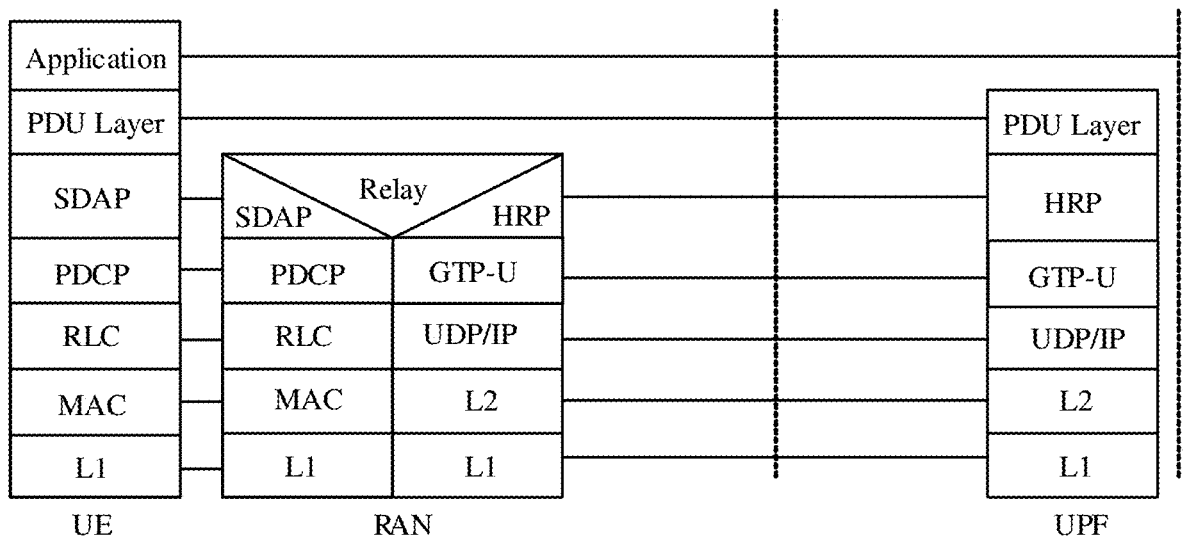
FIG. 7 is a schematic diagram of another protocol stack according to an embodiment of the present invention.

A modified protocol stack for FIG. 6 is shown in FIG. 7. Specifically, a protocol stack corresponding to a core network device such as a UPF device includes a PHY layer, a layer 2 (for example, the layer 2 includes a MAC layer, an RLC layer, a PDCP layer, and an SDAP layer), a UDP/IP layer, a GTP-U layer, an HRP layer, and PDU layer. A protocol stack corresponding to an access network device such as a source base station or a target base station includes a PHY layer, a layer 2 (for example, the layer 2 includes a MAC layer, an RLC layer, a PDCP layer, and an SDAP layer), a UDP/IP layer, a GTP-U layer, and an HRP layer. A protocol stack corresponding to a user equipment such as a UE includes a PHY layer, a layer 2 (for example, the layer 2 includes a MAC layer, an RLC layer, a PDCP layer, and an SDAP layer), a PDU layer, and an application layer. That is, different from the protocol stack structure shown in FIG. 6, in the protocol stack architecture shown in FIG. 7, a new layer (for example, an HRP layer) is introduced above a GTP-U layer of a base station. The HRP layer may generate/process a sequence number at a QoS flow granularity (in other words, a DRB granularity). For example, the HRP layer of the base station may generate/process an HRP SN. In addition, in the protocol stack architecture shown in FIG. 7, a new layer (for example, an HRP layer) is introduced above the GTP-U layer of the UPF device. The HRP layer may generate/process the sequence number at the QoS flow granularity (in other words, the DRB granularity). For example, the HRP layer of the UPF device may generate/process the HRP SN.

As shown in FIG. 7, for downlink transmission, the UPF device needs to generate the sequence number at the QoS flow granularity (or the DRB granularity) for duplication data packets sent to the source base station and the target base station. This function is implemented by an HRP layer. For example, the HRP layer of the UPF device generates the HRP SN. For uplink transmission, the UPF device processes the sequence number at the QoS flow granularity (or the DRB granularity) for a duplication data packet separately received from the source base station and the target base station. For example, the HRP layer of the UPF device processes the HRP SN. In addition, the HRP layer of the UPF device performs operations such as duplicate packet detection, reordering, and in-order delivery based on an HRP SN included in a packet header of the data packet.

As shown in FIG. 7, for the downlink transmission, the source base station or the target base station needs to process the sequence number at the QoS flow granularity (or the DRB granularity) for a duplication data packet received from the core network device. For the uplink transmission, the source base station or the target base station generates the sequence number at the QoS flow granularity (or the DRB granularity) for a duplication data packet received from the UE. Specifically, for the downlink transmission, the source base station or the target base station receives the duplication data packet sent by the UPF device, and a PDCP layer of the source base station determines, based on an HRP SN included in a packet header of a duplication data packet, a PDCP SN corresponding to the received duplication data packet. In addition, the source base station may determine a mapping relationship between the HRP SN and the PDCP SN, and a PDCP layer of the target base station may determine, based on an HRP SN included in a packet header of a duplication data packet and a mapping relationship between an HRP SN and a PDCP SN (for example, the target base station may receive the mapping relationship between the HRP SN and the PDCP SN from the source base station), a PDCP SN corresponding to the received duplication data packet. For the uplink transmission, the source base station or the target base station receives a duplication data packet sent by the UE. The source base station determines, based on a PDCP SN included in a packet header of the duplication data packet, an HRP SN corresponding to the received duplication data packet. For example, the sequence number may be generated by an HRP layer. The source base station may determine a mapping relationship between the HRP SN and the PDCP SN, and the target base station may determine, based on a PDCP SN included in a packet header of a duplication data packet and a mapping relationship between an HRP SN and a PDCP SN (the target base station receives the mapping relationship between the HRP SN and the PDCP SN from the source base station), an HRP SN corresponding to the received duplication data packet. For example, the sequence number may be generated by the HRP layer.

As shown in FIG. 7, for the downlink transmission, the UE needs to perform operations such as duplicate packet detection, reordering, and in-order delivery on a duplication data packet separately received from the source base station and the target base station. For example, a PDCP layer of the UE may perform operations such as duplicate packet detection, reordering, and in-order delivery. For the uplink transmission, the UE generates the duplication data packets and sends the duplication data packets to the source base station and the target base station respectively. For example, the PDCP layer of the UE may generate the duplication data packets.

Figure 8:
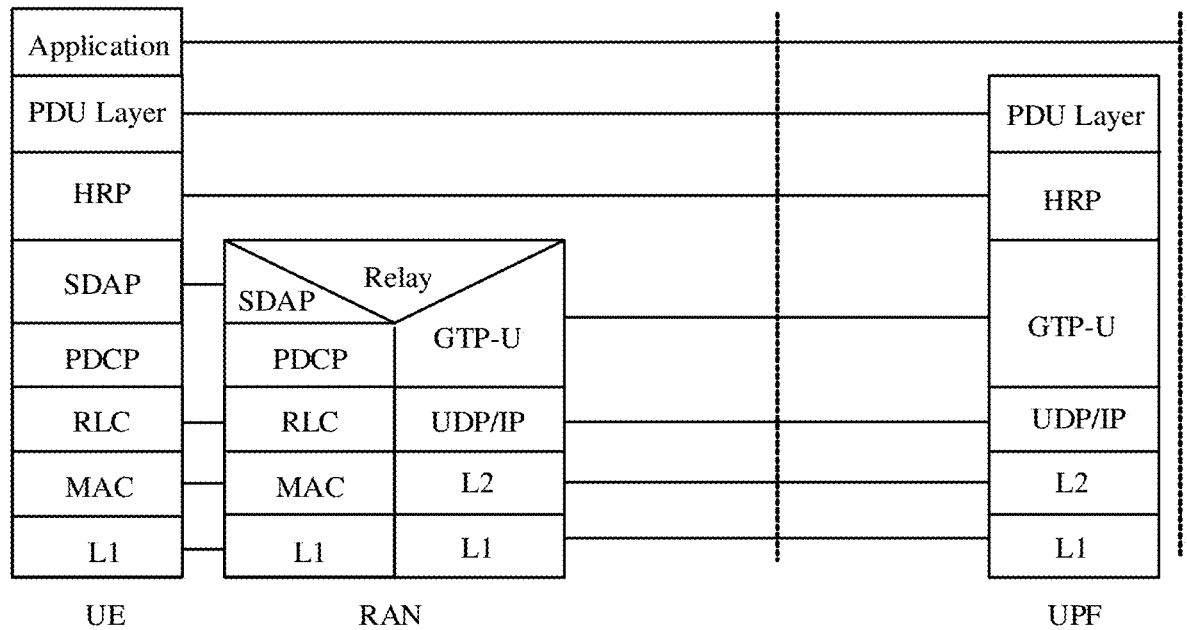
FIG. 8 is a schematic diagram of another protocol stack according to an embodiment of the present invention.

For any one of the foregoing embodiments, in another implementation, a corresponding user plane protocol stack architecture may alternatively be shown in FIG. 8. Specifically, a protocol stack corresponding to a core network device such as a UPF device includes a physical (PHY) layer, a layer 2 (for example, the layer 2 includes a media access control (MAC) layer 1, a radio link control (RLC) layer, a packet data convergence protocol (PDCP) layer, and a service data adaptation protocol (SDAP) layer), a user datagram protocol/internet protocol (UDP/IP) layer, a GTP-U layer, an HRP layer, and a protocol data unit (PDU) layer. A protocol stack corresponding to an access network device such as a source base station or a target base station includes a physical layer (PHY), a layer 2 (for example, the layer 2 includes a media access control (MAC) layer, a radio link control (RLC) layer, a packet data convergence protocol (PDCP) layer, and a service data adaptation protocol (SDAP) layer), a user datagram protocol/internet protocol (UDP/IP) layer, and a GTP-U layer. A protocol stack corresponding to a user equipment such as a UE includes a physical layer (PHY), a layer 2 (for example, the layer 2 includes a media access control (MAC) layer, a radio link control (RLC) layer, a packet data convergence protocol (PDCP) layer, and a service data adaptation protocol (SDAP) layer), an HRP layer, a protocol data unit (PDU) layer, and an application layer.

As shown in FIG. 8, for downlink transmission, the UPF device needs to generate a sequence number at a QoS flow granularity for duplication data packets sent to the source base station and the target base station. Because a QoS flow is at a DRB granularity, that is, only one QoS flow may be mapped to a same DRB, and different QoS flows are mapped to different DRBs, it may also be understood as that for the downlink transmission, the UPF device needs to generate a sequence number at the DRB granularity for the duplication data packets sent to the source base station and the target base station. This function is implemented by an HRP layer. For example, the HRP layer generates an HRP SN. For uplink transmission, the UPF device processes a sequence number at the QoS flow granularity (or the DRB granularity) for a duplication data packet separately received from the source base station and the target base station. For example, the HRP layer processes an HRP SN. In addition, the HRP layer may perform operations such as duplicate packet detection, reordering, and in-order delivery.

As shown in FIG. 8, for the downlink transmission, the source base station sends a duplication data packet received from the core network device to the user equipment. In addition, the target base station may also send a duplication data packet received from the core network device to the user equipment. For an uplink, the source base station sends a duplication data packet received from the user equipment to the UPF device. In addition, the target base station also sends a duplication data packet received from the user equipment to the UPF device. It should be noted that, in the protocol stack architecture shown in FIG. 8, an HRP layer is transparent to the source base station (or the target base station). That is, a base station does not need to process the sequence number at the QoS flow granularity (or the DRB granularity). That is, for a DL, the base station does not need to process an HRP SN included in a data packet received from the UPF device. Correspondingly, for the UL, the base station does not need to process an HRP SN included in a data packet received from the UE.

As shown in FIG. 8, for the user equipment, for the downlink transmission, the UE needs to perform operations such as duplicate packet detection, reordering, and in-order delivery on a duplication data packet separately received from the source base station and the target base station. For example, an HRP layer of the UE performs operations such as duplicate packet detection, reordering, and in-order delivery. For the uplink transmission, the UE generates the duplication data packets and sends the duplication data packets to the source base station and the target base station respectively. For example, the HRP layer of the UE performs data packet duplication, and the UE sends the duplication data packets to the source base station and the target base station respectively. Packet headers of the duplication data packets sent by the UE to the source base station and the target base station respectively each include an HRP SN.

Figure 9:
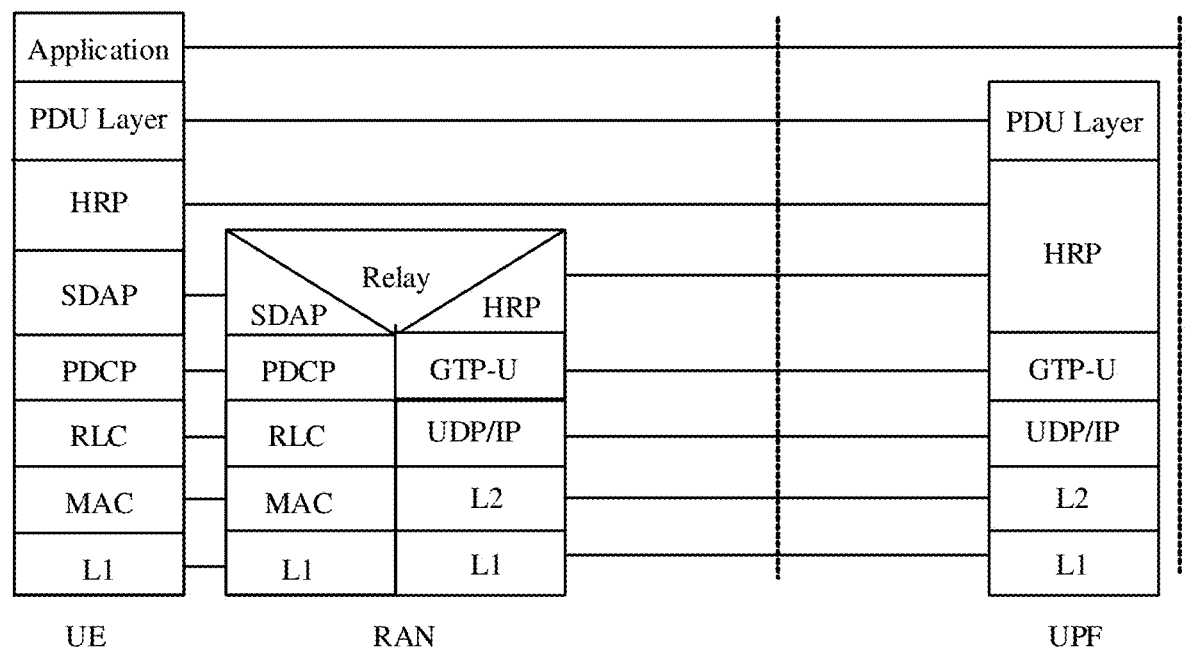
FIG. 9 is a schematic diagram of another protocol stack according to an embodiment of the present invention.

A modified protocol stack for FIG. 8 is shown in FIG. 9. Specifically, a protocol stack corresponding to a core network device such as a UPF device includes a PHY layer, a layer 2 (for example, the layer 2 includes a MAC layer, an RLC layer, a PDCP layer, and an SDAP layer), a UDP/IP layer, a GTP-U layer, an HRP layer, and PDU layer. A protocol stack corresponding to an access network device such as a source base station or a target base station includes a PHY layer, a layer 2 (for example, the layer 2 includes a MAC layer, an RLC layer, a PDCP layer, and an SDAP layer), a UDP/IP layer, a GTP-U layer, and an HRP layer. A protocol stack corresponding to a user equipment such as a UE includes a PHY layer, a layer 2 (for example, the layer 2 includes a MAC layer, an RLC layer, a PDCP layer, and an SDAP layer), an HRP layer, a PDU layer, and an application layer. That is, different from the protocol stack structure shown in FIG. 8, in the protocol stack architecture shown in FIG. 9, a new layer (for example, an HRP layer) is introduced above a GTP-U layer of a base station. The HRP layer may generate/process a number at a QoS flow granularity (or a DRB granularity). For example, the HRP layer of the base station may generate/process an HRP SN.

As shown in FIG. 9, for downlink transmission, the UPF device needs to generate a sequence number at the QoS flow granularity (or the DRB granularity) for duplication data packets sent to the source base station and the target base station. This function may be implemented by an HRP layer and/or a GTP-U layer. For example, a GTP-U packet header of a duplication data packet that is separately sent by the UPF device to the source base station and the target base station includes a GTP-U SN, and/or an HRP packet header of a duplication data packet that is separately sent by the UPF device to the source base station and the target base station includes an HRP SN. For uplink transmission, the UPF device processes the sequence number at the QoS flow granularity (or the DRB granularity) for a duplication data packet separately received from the source base station and the target base station. For example, the HRP layer of the UPF device processes an HRP SN, and the HRP layer may perform operations such as duplicate packet detection, reordering, and in-order delivery based on the HRP SN. Alternatively, for the uplink transmission, the GTP-U layer of the UPF device processes a GTP-U SN, and the GTP-U layer of the UPF device may perform operations such as duplicate packet detection, reordering, and in-order delivery based on the GTP-U SN.

As shown in FIG. 9, for the downlink transmission, the source base station or the target base station needs to process the sequence number at the QoS flow granularity (or the DRB granularity) for a duplication data packet received from the core network device. For the uplink transmission, the source base station or the target base station generates the sequence number at the QoS flow granularity (or the DRB granularity) for a duplication data packet received from the UE. Specifically, for the downlink transmission, the source base station or the target base station receives a duplication data packet sent by the UPF device. In an implementation, a PDCP layer of the source base station determines, based on an HRP SN included in a packet header of a duplication data packet, a PDCP SN corresponding to the received duplication data packet, and the source base station may determine a mapping relationship between the HRP SN and the PDCP SN. Alternatively, in another implementation, a PDCP layer of the source base station determines, based on a GTP-U SN included in a packet header of a duplication data packet, a PDCP SN corresponding to the received duplication data packet, and the source base station may determine a mapping relationship between the GTP-U SN and the PDCP SN. In addition, in an implementation, a PDCP layer of the target base station may determine, based on an HRP SN included in a packet header of a duplication data packet and a mapping relationship between an HRP SN and a PDCP SN (the target base station may receive the mapping relationship between the HRP SN and the PDCP SN from the source base station), a PDCP SN corresponding to the received duplication data packet. Alternatively, in another implementation, a PDCP layer of the target base station determines, based on a GTP-U SN included in a packet header of a duplication data packet and a mapping relationship between a GTP-U SN and a PDCP SN (the target base station may receive the mapping relationship between the GTP-U SN and the PDCP SN from the source base station), a PDCP SN corresponding to the received duplication data packet. For the uplink transmission, the source base station or the target base station receives a duplication data packet sent by the UE. In an implementation, the source base station determines, based on a PDCP SN included in a packet header of a duplication data packet, an HRP SN corresponding to the received duplication data packet, and the source base station may determine a mapping relationship between the HRP SN and the PDCP SN. Alternatively, in another implementation, the source base station determines, based on a PDCP SN included in a packet header of a duplication data packet, a GTP-U SN corresponding to the received duplication data packet, and the source base station may determine a mapping relationship between the GTP-U SN and the PDCP SN. In an implementation, the target base station may determine, based on a PDCP SN included in a packet header of a duplication data packet and a mapping relationship between an HRP SN and a PDCP SN (the target base station may receive the mapping relationship between the HRP SN and the PDCP SN from the source base station), an HRP SN corresponding to the received duplication data packet. Alternatively, in another implementation, the target base station may determine, based on a PDCP SN included in a packet header of a duplication data packet and a mapping relationship between a GTP-U SN and a PDCP SN (the target base station may receive the mapping relationship between the GTP-U SN and the PDCP SN from the source base station), a GTP-U SN corresponding to the received duplication data packet.

As shown in FIG. 9, for the downlink transmission, the UE needs to perform operations such as duplicate packet detection, reordering, and in-order delivery on a duplication data packet separately received from the source base station and the target base station. In an implementation, an HRP layer of the UE performs operations such as duplicate packet detection, reordering, and in-order delivery. Alternatively, in another implementation, a PDCP layer of the UE performs operations such as duplicate packet detection, reordering, and in-order delivery. For the uplink transmission, the UE generates the duplication data packets and sends the duplication data packets to the source base station and the target base station respectively. For example, the HRP layer of the UE performs data packet duplication, and the UE sends the duplication data packets to the source base station and the target base station respectively. Packet headers of the duplication data packets sent by the UE to the source base station and the target base station respectively each include an HRP SN.

The solutions in the foregoing embodiments may be separately applied to one communication system, or two or a combination of a plurality of solutions may be applied to one communication system.

Corresponding to the communication methods provided in the foregoing method embodiments, the embodiments of this application further provide corresponding communication apparatuses (sometimes also referred to as communication devices). The communication apparatus includes a corresponding module or unit configured to perform each part in the foregoing embodiments. The module or unit may be software, hardware, or a combination of software and hardware.

Figure 10:
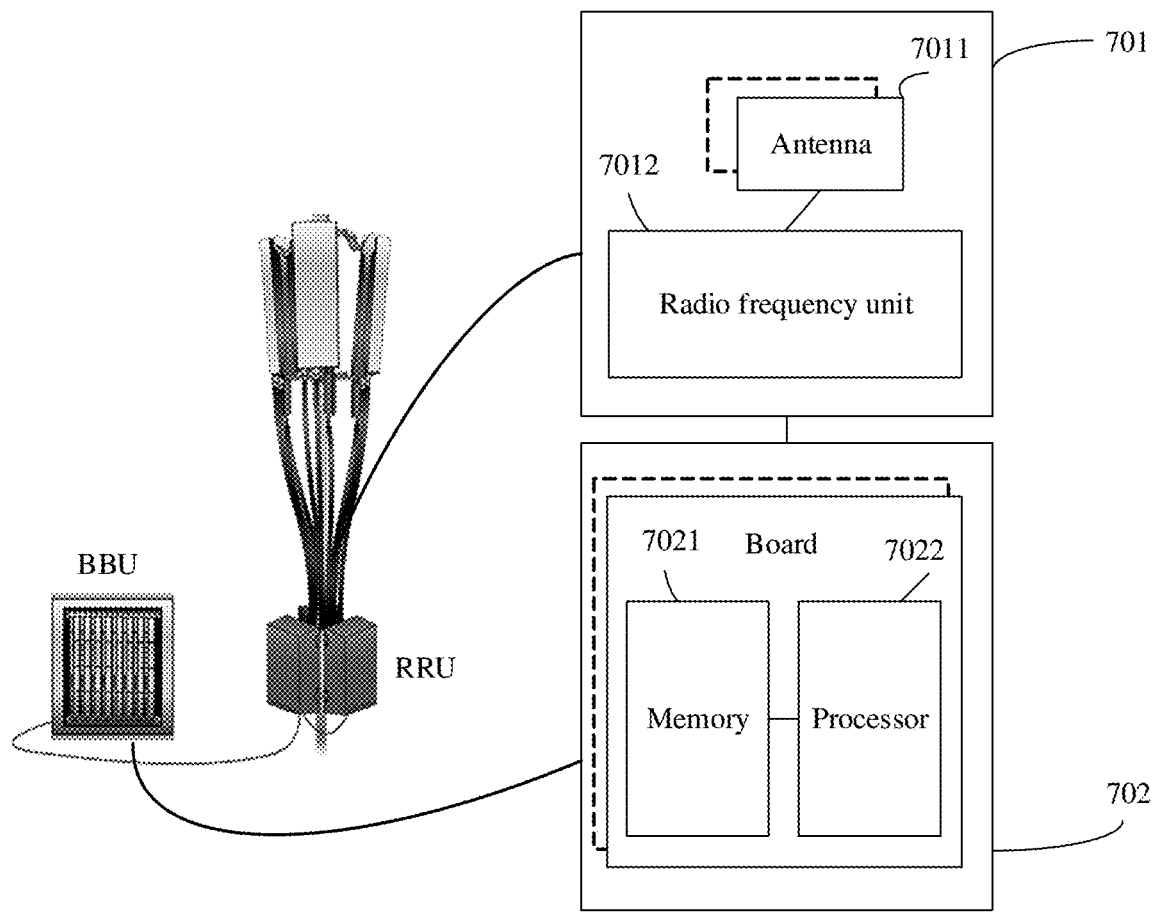
FIG. 10 is a schematic structural diagram of a base station according to an embodiment of the present invention.

FIG. 10 is a schematic structural diagram of a base station. The base station may be applied to the system shown in FIG. 1. The base station may serve as a source base station of a UE and/or serve as a target base station of the UE. The base station includes one or more remote radio units (remote radio unit, RRU) 701 and one or more baseband units (baseband unit, BBU) 702. The RRU 701 may be referred to as a transceiver unit, a transceiver, a transceiver circuit, a transceiver, or the like, and may include at least one antenna 7011 and a radio frequency unit 7012. The RRU 701 is mainly configured to: send/receive a radio frequency signal, and perform conversion between the radio frequency signal and a baseband signal, for example, configured to send the signaling indicator or the reference signal in the foregoing embodiments to a terminal. The BBU 702 is mainly configured to perform baseband processing, control the base station, and so on. The RRU 701 and the BBU 702 may be physically disposed together, or may be physically separated, namely, a distributed base station.

The BBU 702 is a control center of the base station, may also be referred to as a processing unit, and is mainly configured to implement a baseband processing function, for example, channel coding, multiplexing, modulation, and spreading. In an example, the BBU 702 may include one or more boards, and a plurality of boards may jointly support a radio access network (for example, a 5G network) in a single access standard, or may separately support radio access networks in different access standards. The BBU 702 further includes a memory 7021 and a processor 7022. The memory 7021 is configured to store instructions and data that are necessary. The processor 7022 is configured to control the base station to perform a necessary action. The memory 7021 and the processor 7022 may serve the one or more boards. In other words, a memory and a processor may be separately disposed on each board. Alternatively, a plurality of boards may share a same memory and processor. In addition, a necessary circuit is further disposed on each board.

The base station may be configured to implement the methods in the foregoing method embodiments, for example, may implement a function of the source base station or the target base station in the foregoing method embodiments.

In a possible design solution, the base station may include one or more processors. The processor may also be referred to as a processing unit, and may implement a specific control function. The processor may be a general purpose processor, a dedicated processor, or the like. For example, the processor may be a baseband processor or a central processing unit. The baseband processor may be configured to process a communication protocol and communication data. The central processing unit may be configured to: control a communication apparatus (for example, the base station, a baseband chip, a distributed unit (DU), or a centralized unit (CU)), execute a software program, and process data of the software program. In an implementation, the processor stores instructions, and the instructions may be run by the processor, so that the base station performs the methods described in the foregoing method embodiments. In another implementation, the base station includes one or more memories. The memory stores instructions or code, and the instructions or code may be run on the processor, so that the base station performs the methods described in the foregoing method embodiments. Optionally, the memory may further store data. Optionally, the processor may further store instructions and/or data. The processor and the memory may be separately disposed, or may be integrated together.

In another possible design, the base station includes a circuit. The circuit may implement the sending, receiving, or communication function in the foregoing method embodiments.

Figure 11:
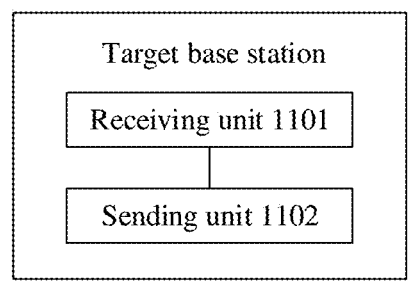
FIG. 11 is a schematic structural diagram of another base station according to an embodiment of the present invention.

For example, corresponding to Embodiment 1, an embodiment of the present invention provides a target base station. As shown in FIG. 11, the target base station includes: a receiving unit 1101, configured to receive a handover request message from a source base station; and a sending unit 1102, configured to send a request message to a first core network device in response to the handover request message, to request a duplicate of a first data packet, where the first data packet is a data packet that is sent by a second core network device to the source base station and that is used for the user equipment UE, and the first core network device and the second core network device are a same core network device or different core network devices.

Optionally, the receiving unit is further configured to receive an acknowledgment message for the request message; the sending unit is further configured to send a handover request acknowledgment message to the source base station.

Optionally, the receiving unit is configured to receive a duplicate of the first data packet from the second core network device.

Optionally, the sending unit is further configured to send a third data packet to the UE in response to the first data packet.

Optionally, the sending unit is further configured to send a fourth data packet to the UE in response to the duplicate of the first data packet.

Optionally, the first data packet and the duplicate of the first data packet each include a first index.

Optionally, the third data packet and the fourth data packet each include a second index.

The receiving unit or the sending unit in this embodiment may include a plurality of subunits, and are respectively configured to receive or send different data or signaling.

Figure 12:
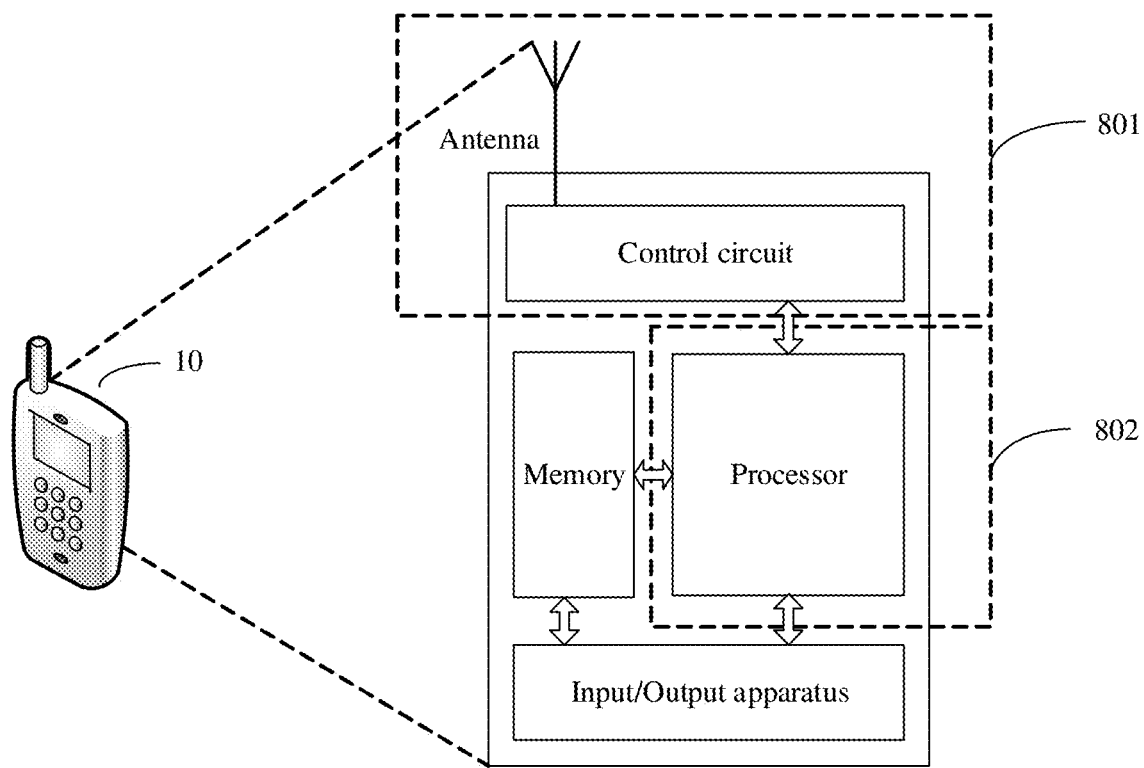
FIG. 12 is a schematic structural diagram of a user equipment according to an embodiment of the present invention.

FIG. 12 is a schematic structural diagram of a terminal. The terminal is applicable to the system shown in FIG. 1. For ease of description, FIG. 12 shows only main components of the terminal. As shown in FIG. 12, the terminal 10 includes a processor, a memory, a control circuit or an antenna, and an input/output apparatus. The processor is mainly configured to: process a communication protocol and communication data, control the entire terminal, execute a software program, and process data of the software program. The memory is mainly configured to store the software program and the data, for example, store the codebook described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to send/receive a radio frequency signal in an electromagnetic wave form. The input/output apparatus, such as a touchscreen, a display, or a keyboard, is mainly configured to: receive data entered by a user, and output data to the user.

After the terminal is powered on, the processor may read a software program in a storage unit, explain and execute instructions of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 12 shows only one memory and one processor. An actual terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to: control the entire terminal, execute the software program, and process the data of the software program. The processor in FIG. 12 integrates functions of the baseband processor and the central processing unit. A person skilled in the art may understand that the baseband processor and the central processing unit may be individually independent processors, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be embedded into the processor, or may be stored in the storage unit in a form of the software program. The processor executes the software program to implement a baseband processing function.

For example, in this embodiment of the present invention, the antenna and the control circuit that have a transceiver function may be considered as a transceiver unit 801 of the terminal 10, and the processor having a processing function may be considered as a processing unit 802 of the terminal 10. As shown in FIG. 12, the terminal 10 includes the transceiver unit 801 and the processing unit 802. The transceiver unit may also be referred to as a transceiver, a transceiver machine, a transceiver apparatus, or the like. Optionally, a component that is in the transceiver unit 801 and that is configured to implement a receiving function may be considered as a receiving unit, and a component that is in the transceiver unit 801 and that is configured to implement a sending function may be considered as a sending unit. In other words, the transceiver unit 801 includes the receiving unit and the sending unit. For example, the receiving unit may also be referred to as a receiver, a receiver, a receiver circuit, or the like, and the sending unit may be referred to as a transmitter, a transmitter, a transmitter circuit, or the like.

The user equipment may be configured to implement the methods in the foregoing embodiments.

In the descriptions of the foregoing embodiments, the communication apparatus is described by using the base station or the terminal device as an example. However, a scope of the communication apparatus described in this application is not limited thereto, and the structure of the communication apparatus may not be limited. The communication apparatus may be an independent device or may be a part of a relatively large device. For example, the device may be an independent integrated circuit IC, a chip, or a chip system or subsystem; a set having one or more ICs; an application-specific integrated circuit ASIC such as a modem (modem); and a module that can be embedded in another devices.

Figure 13:
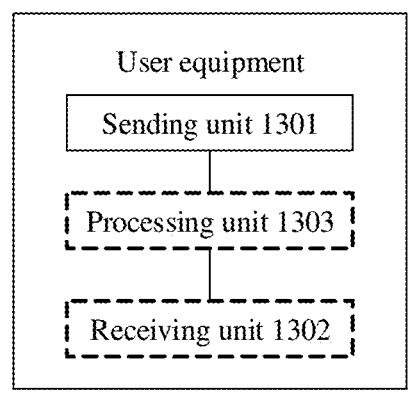
FIG. 13 is a schematic structural diagram of another user equipment according to an embodiment of the present invention.

Corresponding to the foregoing Embodiment 3, an embodiment of the present invention provides a user equipment UE. As shown in FIG. 13, the UE includes: a sending unit 1301, configured to send data packets $P_1, P_2, \ldots,$ and $P_N$ to a source base station, where the sending unit is further configured to send data packets $P_i$ to $P_N$ to a target base station, where the data packet $P_i$ is the $1^{st}$ data packet not correctly received by the source base station in the data packets $P_1$ to $P_N$, N is an integer greater than or equal to 1, and i is an integer greater than or equal to 1 and less than or equal to N.

Optionally, indexes of the data packets $P_1$ to $P_N$ are continuously increasing.

Optionally, the UE further includes a receiving unit 1302, configured to receive indication information from the source base station before the sending unit sends $P_i$ to $P_N$ to the target base station, and the indication information indicates the UE to send the data packets $P_i$ to $P_N$ to the target base station.

Optionally, the indication information is included in a radio resource control RRC reconfiguration message.

Optionally, the UE further includes a processing unit 1303, configured to: before the sending unit sends the data packets $P_i$ to $P_N$ to the target base station, if the UE receives, from the source base station, no response to the data packet $P_i$, or receives, from the source base station, a negative acknowledgment NACK of the data packet $P_i$, and receives an acknowledgment ACK of a data packet before $P_i$ in the data packets $P_1$ to $P_N$, determine that the data packet $P_i$ is the $1^{st}$ data packet not correctly received by the source base station in the data packets $P_1$ to $P_N$.

The receiving unit or the sending unit in this embodiment may include a plurality of subunits, and are respectively configured to receive or send different data or signaling.

Corresponding to Embodiment 1, an embodiment of the present invention further provides a communication system, including a source base station and a target base station.

The source base station is configured to receive a first data packet from a core network device.

The target base station is configured to receive a second data packet from the core network device, where the second data packet is a duplicate of the first data packet, and the first data packet and the second data packet each include a first index.

The source base station is further configured to send first indication information to the target base station, where the first indication information indicates a mapping relationship between the first index and a second index.

The source base station is further configured to send a third data packet to a user equipment UE in response to the first data packet.

The target base station is further configured to send a fourth data packet to the UE in response to the second data packet, where the third data packet and the fourth data packet each include the second index.

Optionally, the source base station is further configured to receive second indication information from the core network device.

The source base station is further configured to determine the mapping relationship between the first index and the second index based on the first index in response to the second indication information.

Optionally, the second indication information is included in the first data packet.

Optionally, the source base station is further configured to receive a fifth data packet from the UE.

The target base station is further configured to receive a sixth data packet from the UE, where the sixth data is a duplicate of the fifth data packet, and the fifth data packet and the sixth data packet each include a third index.

The source base station is further configured to send a seventh data packet to the core network device in response to the fifth data packet.

The target base station is further configured to send an eighth data packet to the core network device in response to the sixth data packet, where the seventh data packet and the eighth data packet each include a fourth index.

Optionally, the source base station is further configured to send third indication information to the target base station, where the third indication information indicates a mapping relationship between the third index and the fourth index.

Optionally, the source base station is further configured to receive fourth indication information from the UE.

The source base station is further configured to determine the mapping relationship between the third index and the fourth index based on the third index in response to the fourth indication information.

Optionally, the fourth indication information is included in the fifth data packet.

Corresponding to the foregoing Embodiment 3, an embodiment of the present invention further provides a communication system, including a source base station and a target base station.

The target base station is configured to receive data packets Pi to PN from the user equipment, where the data packet Pi is the $1^{st}$ data packet not correctly received by the source base station in data packets P1 to PN sent by the user equipment to the source base station, N is an integer greater than or equal to 1, and i is an integer greater than or equal to 1 and less than or equal to N.

The target base station is further configured to send the data packets Pi to PN to a core network device.

The source base station is configured to send a data packet before the data packet Pi in the data packets P1 to PN to the core network device.

Optionally, indexes of the data packets P1 to PN are continuously increasing.

Optionally, before the target base station receives the data packets Pi to PN, the target base station is further configured to send indication information to the source base station, where the indication information indicates the user equipment to send the data packets Pi to PN to the target base station.

Corresponding to the foregoing Embodiment 3, an embodiment of the present invention further provides another communication system, including a source base station and a target base station.

The source base station is configured to receive the first group of data packets from a user equipment.

The target base station is configured to receive the second group of data packets from the user equipment, where the first group of data packets are data packets correctly received by the source base station in data packets sent by the user equipment to the source base station, and the second group of data packets are retransmitted data packets of data packets not correctly received by the source base station in the data packets sent by the user equipment to the source base station.

The source base station is further configured to send the first group of data packets to a core network device.

The target base station is further configured to send the second group of data packets to the core network device.

Optionally, the first group of data packets are data packets having discontinuous indexes.

An embodiment of the present invention further provides a core network device, configured to implement functions of the core network device in the foregoing method embodiments. The core network device provided in this embodiment of the present invention may include a plurality of devices. The core network device may include a memory, a processor, a transceiver circuit, and the like.

It should be noted that numbers such as "first", "second", and "third" in the embodiments of the present invention are merely used to distinguish between a plurality of nouns with a same name in one embodiment, and do not represent an order or a device processing order. Nouns with different numbers in different embodiments may have a same meaning. Nouns with a same number in different embodiments may have different meanings. A specific meaning needs to be determined based on a specific solution.

In this application, unless otherwise specified, an element represented in a singular form is intended to represent "one or more", but is not intended to represent "one and only one". "Some" means one or more. "At least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate a, b, c, a and b, a and c, b and c, or a, b, and c, where a, b, and c may be singular or plural.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A method, comprising:
receiving, by a source base station, a first data packet from a core network device, the first data packet comprising second indication information carried in a packet header of the first data packet, wherein the second indication information indicates to the source base station a duplicate transmission process is started, and to preferentially send to a user equipment (UE) a non-duplication data packet that is received by the source base station before the duplicate transmission process is started and that is not yet sent to the UE when the second indication information is received;
receiving, by a target base station, a second data packet from the core network device, wherein the second data packet is a duplicate of the first data packet, and the first data packet and the second data packet each comprise a first index, the first index is a sequence number of a first protocol and is carried in the packet header of the first data packet and a packet header of the second data packet, and wherein, before the core network device begins the duplicate transmission process, packets sent from the core network device to the source base station do not carry any sequence numbers of the first protocol in packet headers of the packets, and the first index and the second indication information being comprised in the first data packet notifies the source base station that the core network device begins the duplicate transmission process;

in response to receiving the first data packet comprising the first index and the second indication information, preferentially sending, by the source base station to the UE, the non-duplication data packet, determining, by the source base station, a mapping relationship between the first index and a second index based on the first index, and sending, by the source base station, first indication information to the target base station, wherein the first indication information indicates the mapping relationship between the first index and the second index;

sending, by the source base station, a third data packet to the UE in response to receiving the first data packet; and sending, by the target base station, a fourth data packet to the UE in response to receiving the second data packet, wherein the third data packet and the fourth data packet each comprise the second index;

wherein receiving, by the target base station, the second data packet from the core network device comprises receiving, by the target base station, the second data packet from the core network device before receiving the first indication information from the source base station;

wherein the method further comprises buffering, by the target base station, the second data packet; and wherein sending, by the target base station, the fourth data packet to the UE in response to receiving the second data packet comprises sending, by the target base station, the fourth data packet to the UE in response to receiving the first indication information.

2. The method according to claim 1, further comprising:
receiving, by the source base station, a fifth data packet from the UE;
receiving, by the target base station, a sixth data packet from the UE, wherein the sixth data packet is a duplicate of the fifth data packet, and the fifth data packet and the sixth data packet each comprise a third index;
sending, by the source base station, a seventh data packet to the core network device in response to receiving the fifth data packet; and
sending, by the target base station, an eighth data packet to the core network device in response to receiving the sixth data packet, wherein the seventh data packet and the eighth data packet each comprise a fourth index.

3. The method according to claim 2, further comprising:
sending, by the source base station, third indication information to the target base station, wherein the third indication information indicates a mapping relationship between the third index and the fourth index, and the third indication information is sent separately from the first indication information.

4. The method according to claim 3, further comprising:
receiving, by the source base station, fourth indication information from the UE; and
determining, by the source base station, the mapping relationship between the third index and the fourth index based on the third index and in response to receiving the fourth indication information.

5. The method according to claim 4, wherein the fourth indication information is comprised in the fifth data packet.

6. The method according to claim 1, wherein the first indication information comprises a value of the first index and a value of the second index.

7. The method according to claim 1, wherein the first indication information comprises a mapping formula of the first index and the second index.

8. The method according to claim 1, wherein the first indication information comprises a difference between a value of the first index and a value of the second index.

9. The method according to claim 1, wherein the packet header of the first data packet further comprises sequence number status transfer indication information indicating whether or not the source base station will send a sequence number status transfer message to the target base station.

10. The method according to claim 9, wherein the sequence number status transfer indication information is a bit, a first binary value of the bit indicates the source base station will send a sequence number status transfer message to the target base station, and a second binary value of the bit indicates the source base station will not send a sequence number status transfer message to the target base station.

11. The method according to claim 1, wherein the first data packet corresponds to a protocol data unit session identifier; and
wherein the packets sent from the core network device to the source base station not carrying any sequence numbers of the first protocol in packet headers of the packets before the core network device begins the duplicate transmission process comprises:
packets corresponding to the protocol data unit session identifier sent from the core network device to the source base station not carrying any sequence numbers of the first protocol in packet headers of the packets before the core network device begins the duplicate transmission process.

12. A system, comprising:
a source base station; and
a target base station;
wherein the source base station is configured to receive a first data packet from a core network device, the first data packet comprising second indication information carried in a packet header of the first data packet, wherein the second indication information indicates to the source base station a duplicate transmission process is started, and to preferentially send to a user equipment (UE) a non-duplication data packet that is received by the source base station before the duplicate transmission process is started and that is not yet sent to the UE when the second indication information is received;
wherein the target base station is configured to receive a second data packet from the core network device, the second data packet is a duplicate of the first data packet, the first data packet and the second data packet each comprise a first index, the first index is a sequence number of a first protocol and is carried in the packet header of the first data packet and a packet header of the second data packet, and wherein, before the core network device begins the duplicate transmission process, packets sent from the core network device to the source base station do not carry any sequence numbers of the first protocol in packet headers of the packets, and the first index and the second indication information being comprised in the first data packet notifies the source base station that the core network device begins the duplicate transmission process;

wherein the source base station is further configured to:
  in response to receiving the first data packet comprising the first index and the second indication information, preferentially send, to the UE, the non-duplication data packet, determine a mapping relationship between the first index and a second index based on the first index, and send first indication information to the target base station, wherein the first indication information indicates a mapping relationship between the first index and the second index;
wherein the source base station is further configured to send a third data packet to the UE in response to receiving the first data packet; and
wherein the target base station is further configured to send a fourth data packet to the UE in response to receiving the second data packet, and the third data packet and the fourth data packet each comprise the second index;
wherein the target base station being configured to receive the second data packet from the core network device comprises the target base station being configured to receive the second data packet from the core network device before receiving the first indication information from the source base station;
wherein the target base station is further configured to buffer the second data packet; and
wherein the target base station being configured to send the fourth data packet to the UE in response to receiving the second data packet comprises sending, by the target base station, the fourth data packet to the UE in response to receiving the first indication information.

13. The system according to claim 12, wherein:
the source base station is further configured to receive a fifth data packet from the UE;
the target base station is further configured to receive a sixth data packet from the UE, wherein the sixth data packet is a duplicate of the fifth data packet, and the fifth data packet and the sixth data packet each comprise a third index;
the source base station is further configured to send a seventh data packet to the core network device in response to receiving the fifth data packet; and
the target base station is further configured to send an eighth data packet to the core network device in response to receiving the sixth data packet, wherein the seventh data packet and the eighth data packet each comprise a fourth index.

14. The system according to claim 13, wherein the source base station is further configured to send third indication information to the target base station, and the third indication information indicates a mapping relationship between the third index and the fourth index, and wherein the third indication information is sent separately from the first indication information.

15. The system according to claim 14, wherein:
the source base station is further configured to receive fourth indication information from the UE; and
the source base station is further configured to determine the mapping relationship between the third index and the fourth index based on the third index and in response to receiving the fourth indication information.

16. The system according to claim 15, wherein the fourth indication information is comprised in the fifth data packet.

17. The system according to claim 12, wherein the first indication information comprises a value of the first index and a value of the second index.

18. The system according to claim 12, wherein the first indication information comprises a mapping formula of the first index and the second index.

19. The system according to claim 12, wherein the first indication information comprises a difference between a value of the first index and a value of the second index.

20. The system according to claim 12, wherein the packet header of the first data packet further comprises sequence number status transfer indication information indicating whether or not the source base station will send a sequence number status transfer message to the target base station, wherein the sequence number status transfer indication information is a bit, a first binary value of the bit indicates the source base station will send a sequence number status transfer message to the target base station, and a second binary value of the bit indicates the source base station will not send a sequence number status transfer message to the target base station.

* * * * *